United States Patent
Okada et al.

(10) Patent No.: US 10,303,832 B2
(45) Date of Patent: May 28, 2019

(54) ARCHITECTURE GENERATING DEVICE

(71) Applicant: MITSUBISHI ELECTRIC CORPORATION, Tokyo (JP)

(72) Inventors: Naoya Okada, Tokyo (JP); Ryo Yamamoto, Tokyo (JP); Koki Murano, Tokyo (JP); Yoshihiro Ogawa, Tokyo (JP); Noriyuki Minegishi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/740,732

(22) PCT Filed: Sep. 18, 2015

(86) PCT No.: PCT/JP2015/076656
§ 371 (c)(1),
(2) Date: Dec. 28, 2017

(87) PCT Pub. No.: WO2017/046941
PCT Pub. Date: Mar. 23, 2017

(65) Prior Publication Data
US 2018/0196907 A1 Jul. 12, 2018

(51) Int. Cl.
*G06F 17/50* (2006.01)

(52) U.S. Cl.
CPC ......... *G06F 17/5045* (2013.01); *G06F 17/50* (2013.01); *G06F 17/5022* (2013.01); *G06F 2217/06* (2013.01); *G06F 2217/84* (2013.01)

(58) Field of Classification Search
None
See application file for complete search history.

(56) References Cited

U.S. PATENT DOCUMENTS

| | | | |
|---|---|---|---|
| 8,214,189 B2 * | 7/2012 | Kato | G06F 17/5022 703/13 |
| 9,025,457 B2 * | 5/2015 | Yamaguchi | G06F 1/3206 370/235 |
| 2007/0271080 A1 | 11/2007 | Tatsuoka et al. | |
| 2008/0040700 A1 | 2/2008 | Katoh et al. | |
| 2009/0204380 A1 | 8/2009 | Kato et al. | |
| 2013/0028090 A1 | 1/2013 | Yamaguchi et al. | |

FOREIGN PATENT DOCUMENTS

| | | |
|---|---|---|
| JP | 5-197774 A | 8/1993 |
| JP | 11-184895 A | 7/1999 |
| JP | 3045286 B2 | 5/2000 |
| JP | 2002-269163 A | 9/2002 |

(Continued)

*Primary Examiner* — Leigh M Garbowski
(74) *Attorney, Agent, or Firm* — Birch, Stewart, Kolasch & Birch, LLP

(57) ABSTRACT

A specification editing unit edits a hardware specification file in order to replace a plurality of arrays used in a plurality of processes with a shared array. If a post-edit hardware specification file does not satisfy constraint, a specification transforming unit transforms the hardware specification file so that the plurality of processes are executed in a parallel manner. An architecture generating unit generates an architecture file expressing an architecture of an SoC (System On Chip) having hardware corresponding to the hardware specification file.

5 Claims, 26 Drawing Sheets

(56) References Cited

FOREIGN PATENT DOCUMENTS

| | | |
|---|---|---|
| JP | 2004-86786 A | 3/2004 |
| JP | 2004-288205 A | 10/2004 |
| JP | 2007-272671 A | 10/2007 |
| JP | 2007-310449 A | 11/2007 |
| JP | 2008-204341 A | 9/2008 |
| JP | 2009-163576 A | 7/2009 |
| JP | 2013-125419 A | 6/2013 |
| JP | 5312151 B2 | 10/2013 |
| JP | 2013-254472 A | 12/2013 |
| JP | 2014-106639 A | 6/2014 |
| WO | WO 2011/142087 A1 | 11/2011 |

\* cited by examiner

Fig. 3

300: SYSTEM SPECIFICATION FILE

```
unsigned int memA[10000];
unsigned short memB[10000];
unsigned short memC[5000];              301:DECLARATION STATEMENT
unsigned longmemD[50000];
unsigned long long memE[25000];
unsigned int memF[30000];

int y1 = sw1();

for( int j; j < 100; j++ ) {
  //process A
  for( int i; i < 10000; i++ ) {            302:PROCESSING STSTEMENT
    /* describe operation of process A */
    memA[i] = result;
  }
  //process B
  for( int i; i < 10000; i++ ) {
    /* describe operation of process B (read necessary data from memA) */   302
    memB[i] = result;
  }
  //process C
  for( int i; i < 5000; i++ ) {
    /* describe operation of process C (read necessary data from memB) */   302
    memC[i] = result;
  } int tmp1 = func1();
  bool tmp2 = func2();

//process D
  for( int i; i < 50000; i++ ) {
    /* describe operation of process D (read necessary data from memC) */   302
    memD[i] = result;
  }
  //process E
  for( int i; i < 25000; i++ ) {
    /* describe operation of process E (read necessary data from memD) */   302
    memE[i] = result;
  }
  //process F
  for( int i; i < 30000; i++ ) {
    /* describe operation of process F (read necessary data from memE) */   302
    memF[i] = result;
  }
}
int y2 = sw2();
```

Fig. 4

191: CONSTRAINT INFORMATION

| NO. | TYPE OF CONSTRAINT | CONSTRAINT VALUE |
|---|---|---|
| 1 | SIZE CONSTRAINT | 100 Kgate |
| 2 | TIME CONSTRAINT | 10000 Cycle |

Fig. 5

192: SOFTWARE SPECIFICATION FILE

```
//system specification of software process int y1 = sw1();
int y2 = sw2();
```

Fig. 6

193:HARDWARE SPECIFICATION FILE

```
//system specification of hardware process unsigned int memA[10000];
unsigned short memB[10000];
unsigned short memC[5000];            ⎫
unsigned int memD[50000];             ⎬ 301
unsigned long long memE[25000];       ⎭
unsigned int memF[30000];

for( int j; j < 100; j++ ) {

//process A
  for( int i; i < 10000; i++ ) {              ← 302
    /* describe operation of process A */
    memA[i] = result;
  }
  //process B
  for( int i; i < 10000; i++ ) {                                              ← 302
    /* describe operation of process B (read necessary data from memA) */
    memB[i] = result;
  }
  //process C
  for( int i; i < 5000; i++ ) {                                               ← 302
    /* describe operation of process C (read necessary data from memB) */
    memC[i] = result;
  }
  int tmp1 = func1();
  bool tmp2 = func2();

//process D
  for( int i; i < 50000; i++ ) {                                              ← 302
    /* describe operation of process D (read necessary data from memC) */
    memD[i] = result;
  }

//process E
  for( int i; i < 25000; i++ ) {                                              ← 302
    /* describe operation of process E (read necessary data from memD) */
    memE[i] = result;
  }

//process F
  for( int i; i < 30000; i++ ) {                                              ← 302
    /* describe operation of process F (read necessary data from memE) */
    memF[i] = result;
  }

193: HARDWARE SPECIFICATION FILE

```
//system specification of hardware process unsigned long long Sharedmem[50000]; // shared array        303: DECLARATION
                                                                STATEMENT
/*wait processing start instruction from software */   (S)

for( int j; j < 100; j++ ) {
  //process A/
  for( int i; i < 10000; i++ ) {        304: PROCESSING
    /* describe operation of process A */    STATEMENT
    Sharedmem[i] = result;
  }
  //process B
  for( int i; i < 10000; i++ ) {                                         304
    /* describe operation of process B (read necessary data from Sharedmem) */
    Sharedmem[i] = result;
  }
  //process C
  for( int i; i < 5000; i++ ) {                                          304
    /* describe operation of process C (read necessary data from Sharedmem) */
    Sharedmem[i] = result;
  } int tmp1 = func1();
  bool tmp2 = func2();

//process D
  for( int i; i < 50000; i++ ) {                                         304
    /* describe operation of process D (read necessary data from Sharedmem) */
    Sharedmem[i] = result;
  }
  //process E
  for( int i; i < 25000; i++ ) {                                         304
    /* describe operation of process E (read necessary data from Sharedmem) */
    Sharedmem[i] = result;
  }
  //process F
  for( int i; i < 30000; i++ ) {                                         304
    /* describe operation of process F (read necessary data from Sharedmem) */
    Sharedmem[i] = result;
  }
}

/* output computation end flag to software */   (S)
```

Fig.8

193: HARDWARE SPECIFICATION FILE

```
//system specification of hardware process
unsigned short memDin[5000];    //connection signal between processing block 1 and processing block 2
unsigned short memDout[50000];  //connection signal between processing block 2 and processing block 3
```
← 305 processing block (1)

processing block (2)

processing block (3)

Fig. 9

```
//processing block (1)
unsigned int    SharedmemABC[50000]; // shared array ABC    ← 307

/* wait for processing start instruction from software */ for( int j; j < 100; j++ ) {

//process A
  for( int i; i < 10000; i++ ) {
    /* describe operation of process A */    ← 308
    SharedmemABC[i] = result;
  }

//process B
  for( int i; i < 10000; i++ ) {                                       ← 308
    /* describe operation of process B (read necessary data from SharedmemABC) */
    SharedmemABC [i] = result;
  }

//process C
  for( int i; i < 5000; i++ ) {                                        ← 306
    /* describe operation of process C (read necessary data from SharedmemABC) */
    memDin [i] = result;
  } int tmp1 = func1();
  bool tmp2 = func2();
}
```

Fig. 10

```
//processing block (2)

for( int j; j < 100; j++ ) {
  // process D
  for( int i; i < 50000; i++ ) {                                    ← 306
    /* describe operation of process D (read necessary data from memDin) */
    memDout[i] = result;
  }
}
```

Fig. 11

```
//processing block (3)

unsigned long long SharedmemEF[30000]; // shared array EF           ← 307

/* wait for processing start instruction from software */ for( int j; j < 100; j++ ) {
  // process E
  for( int i; i < 25000; i++ ) {                                    ← 306
    /* describe operation of process E (read necessary data from memDout) */
    SharedmemEF[i] = result;
  }
  // process F
  for( int i; i < 30000; i++ ) {                                    ← 308
    /* describe operation of process F (read necessary data from SharedmemEF) */
    SharedmemEF[i] = result;
  }
}

/* output computation end flag to software */
```

Fig.12

193:HARDWARE SPECIFICATION FILE ← 305

```
//system specification of hardware process
unsigned int    memAout[10000]; //connection signal between processing bock 1-1 and processing block 1-2
unsigned short  memBout[10000]; //connection signal between processing bock 1-2 and processing block 1-3
unsigned short  memDin[5000];   //connection signal between processing bock 1-3 and processing block 2
unsigned short  memDout[50000]; //connection signal between processing bock 2 and processing block 3
``` processing block (1-1)

processing block (1-2)

processing block (1-3)

processing block (2)

processing block (3)

Fig. 13

```
//processing block (1-1)

/* wait for processing start instruction from software */ for( int j; j < 100; j++ ) {
  // process A
  for( int i; i < 10000; i++ ) {
    /* describe operation of process A */     ← 306
    memAout[i] = result;
  }
}
```

Fig. 14

```
//processing block (1-2)

for( int j; j < 100; j++ ) {
  // process B                                              306
  for( int i; i < 10000; i++ ) {
    /* describe operation of process B (read necessary data from memAout) */
    memBout[i] = result;
  }
}
```

Fig. 15

```
//processing block (1-3)

for( int j; j < 100; j++ ) {
  //process C                                               306
  for( int i; i < 5000; i++ ) {
    /* describe operation of process C (read necessary data from memBout) */
    memDin[i] = result;
  }
}
```

Fig.16

193: HARDWARE SPECIFICATION FILE — 305

```
//system specification of hardware process
unsigned short memBout[10000]; //connection signal between processing bock 1-1 and processing block 1-2
unsigned short memDin[5000];   //connection signal between processing bock 1-2 and processing block 2
unsigned short memDout[50000]; //connection signal between processing bock 2 and processing block 3
``` processing block (1-1)

processing block (1-2)

processing block (2)

processing block (3)

Fig. 17

```
// processing block (1-1)

/* wait for processing start instruction from software */ unsigned int SharedmemAB[10000]; // shared array AB    ← 307 for( int j; j < 100; j++ ) {
  //process A
  for( int i; i < 10000; i++ ) {           ← 308
    /* describe operation of process A */
    SharedmemAB[i] = result;
  }
  //process B                                                    306
  for( int i; i < 10000; i++ ) {
    /* describe operation of process B (read necessary data from SharedmemAB) */
    memBout[i] = result;
  }
}
```

Fig. 18

```
//processing block (1-2)

for( int j; j < 100; j++ ) {
  // process C                                                   306
  for( int i; i < 5000; i++ ) {
    /* describe operation of process C (read necessary data from SharedmemBout) */
    memDin[i] = result;
  }
}
```

220: ARRAY INFORMATION

| NO. | ARRAY NAME | BIT WIDTH | NUMBER OF ELEMENTS |
|---|---|---|---|
| 1 | memA | 32 | 10000 |
| 2 | memB | 16 | 10000 |
| 3 | memC | 16 | 5000 |
| 4 | memD | 32 | 50000 |
| 5 | memE | 64 | 25000 |
| 6 | memF | 32 | 30000 |

Fig. 24

192:SOFTWARE SPECIFICATION FILE

```
//system specification of software process
int y1 = sw1();
/* output processing start instruction to hardware */   ← (H)
/* wait for processing end flag from hardware */   ← (H)
int y2 = sw2();
```

Fig. 25

| No. | ASSESSMENT CONTENTS | ASSESSMENT RESULT |
|---|---|---|
| 1 | CIRCUIT SCALE | 20 Kgate |
| 2 | PROCESSING TIME | 100000 Cycle |

| No. | PROCESS NAME | PROCESSING TIME |
|---|---|---|
| 1 | PROCESS A | 300 Cycle |
| 2 | PROCESS B | 500 Cycle |
| 3 | PROCESS C | 400 Cycle |
| 4 | PROCESS D | 1000 Cycle |
| 5 | PROCESS E | 100 Cycle |
| 6 | PROCESS F | 100 Cycle |

Fig. 30

| No. | ASSESSMENT CONTENTS | ASSESSMENT RESULT |
|---|---|---|
| 1 | CIRCUIT SCALE | 60 Kgate |
| 2 | PROCESSING TIME | 20000 Cycle |

| No. | ASSESSMENT CONTENTS | ASSESSMENT RESULT |
|-----|---------------------|-------------------|
| 1   | CIRCUIT SCALE       | 120 Kgate         |
| 2   | PROCESSING TIME     | 4000 Cycle        |

| No. | ASSESSMENT CONTENTS | ASSESSMENT RESULT |
|---|---|---|
| 1 | CIRCUIT SCALE | 90 Kgate |
| 2 | PROCESSING TIME | 8000 Cycle |

ARCHITECTURE GENERATING DEVICE

TECHNICAL FIELD

The present invention relates to a technology that assists architecture design of an SoC (System On Chip).

BACKGROUND ART

A system widely used in household electric appliances, office equipment, and so on is generally a built-in system composed of hardware and software.

The built-in system is composed of an ASIC, a processor, a memory, and so on. The ASIC may be replaced with an FPGA.

ASIC is an abbreviation for Application Specific Integrated Circuit. FPGA is an abbreviation for Field-Programmable Gate Array.

In recent years, a built-in system is provided in the form of SoC.

The SoC is a single semiconductor chip in which all the functions necessary for the operation of the system are implemented.

In the design of the built-in system, it is necessary to divide the specification describing the processing function of the entire system into a part to be made as hardware with using the ASIC or the like and a part to be made as software in the form of a program which is executed by a processor. This division is called software/hardware function division.

Also, in design of the built-in system, it is necessary to study how to implement a plurality of divided functions on the SoC so that a desired performance can be achieved. Such design is called architecture design.

Patent Literature 1 discloses a device which executes software/hardware function division by calculating the loads of processes from the specification describing the processing function of the entire system and designing a process whose load exceeds a threshold value, as hardware.

Patent Literature 2 discloses a device which generates a communication interface by automatically determining a connection bus between modules based on previously given hardware configuration information. The hardware configuration information is information including connection information such as an on-chip bus and direct connection.

If Patent Literature 1 and Patent Literature 2 are combined, automatic SoC generation from algorithm C can be achieved. Algorithm C is an algorithm described in C language.

In order to automatically generate SoC, however, it is necessary to study in advance SoC architecture to realize a system specification. More specifically, it is necessary to study in advance the configuration of a module that constitutes the hardware provided to the SoC.

Hardware module configuration is conventionally determined by conducting module division according to the experience of the designer. In addition, the module division is conventionally conducted from a viewpoint such as a parallelization of process operations and common circuit use by analyzing the system specification of the process to be made as hardware.

However, it is very difficult to conduct optimal module division according to the experience of the designer, and accordingly there is a fear that large rework may occur. A large rework occurs when it is proved in the post-process of the SoC design that an expected performance has not been achieved, or the circuit scale may exceed the chip area.

CITATION LIST

Patent Literature

Patent Literature 1: JP 2013-125419 A
Patent Literature 2: JP 2008-204341 A
Patent Literature 3: JP 5312151

SUMMARY OF INVENTION

Technical Problem

The present invention has as its objective to enable assisting SoC architecture design.

Solution to Problem

An architecture generating device includes:

a declaration statement identifying unit to identify a plurality of declaration statements from a hardware specification file being a file in which processes to be executed by hardware are described in a programming language, the hardware specification file including a plurality of processing statements indicating a plurality of processes that use arrays different from each other, and also including the plurality of declaration statements declaring a plurality of arrays used in the plurality of processes; and a specification generating unit to generate a post-edit hardware specification file by replacing the identified plurality of declaration statements with a declaration statement declaring a shared array to be shared by the plurality of processes and changing each of the plurality of processing statements to a processing statement indicating a process that uses the shared array.

Advantageous Effects of Invention

According to the present invention, a hardware specification file in which a plurality of arrays are replaced with a shared array is generated. By generating such a hardware specification file, it is possible to assist SoC architecture design.

BRIEF DESCRIPTION OF DRAWINGS

FIG. 3 is a configuration diagram of a system specification file 300 in Embodiment 1.
FIG. 4 is a configuration diagram of constraint information 191 in Embodiment 1.
FIG. 5 is a configuration diagram of a software specification file 192 in Embodiment 1.
FIG. 6 is a configuration diagram of a hardware specification file 193 in Embodiment 1.
FIG. 7 is a configuration diagram of a post-edit hardware specification file 193 in Embodiment 1.
FIG. 8 is a configuration diagram of a post-transform hardware specification file 193 in Embodiment 1.
FIG. 9 is a configuration diagram of a processing block (1) in Embodiment 1.

FIG. 10 is a configuration diagram of a processing block (2) in Embodiment 1.

FIG. 11 is a configuration diagram of a processing block (3) in Embodiment 1.

FIG. 12 is a configuration diagram of a post-re-transform hardware specification file 193 in Embodiment 1.

FIG. 13 is a configuration diagram of a processing block (1-1) in Embodiment 1.

FIG. 14 is a configuration diagram of a processing block (1-2) in Embodiment 1.

FIG. 15 is a configuration diagram of a processing block (1-3) in Embodiment 1.

FIG. 16 is a configuration diagram of a post-re-transform hardware specification file 193 in Embodiment 1.

FIG. 17 is a configuration diagram of a processing block (1-1) in Embodiment 1.

FIG. 18 is a configuration diagram of a processing block (1-2) in Embodiment 1.

FIG. 24 is a diagram illustrating a post-transform software specification file 192 in Embodiment 1.

FIG. 25 is a diagram illustrating an assessment result of the post-edit hardware specification file 193 in Embodiment 1.

FIG. 30 is a diagram illustrating an assessment result of the post-transform hardware specification file 193 in Embodiment 1.

DESCRIPTION OF EMBODIMENTS

Embodiment 1

Figure 1:
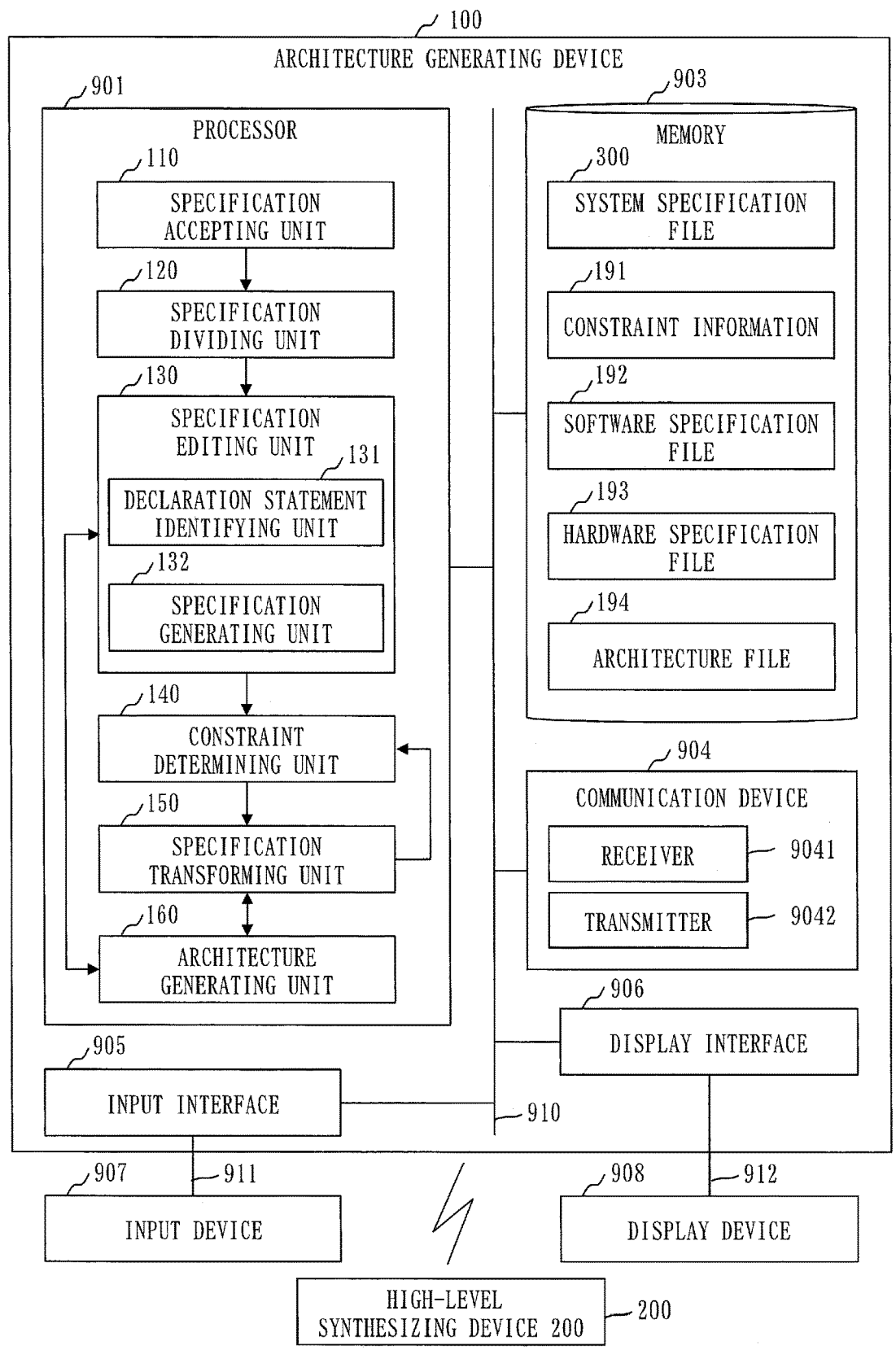
FIG. 1 is a configuration diagram of an architecture generating device 100 in Embodiment 1.

An architecture generating device 100 which assists SoC (System On Chip) architecture design will be described with reference to FIGS. 1 to 36.

Description of Configuration

A configuration of the architecture generating device 100 will be described with reference to FIG. 1.

The architecture generating device 100 is a computer provided with hardware devices such as a processor 901, a memory 903, a communication device 904, an input interface 905, and a display interface 906.

The processor 901 is connected to the above other hardware devices via a signal line 910. The input interface 905 is connected to an input device 907 via a cable 911. The display interface 906 is connected to a display device 908 via a cable 912. The processor 901 is an IC (Integrated Circuit) to perform processing and controls the other hardware devices. An example of the processor 901 includes a CPU, a DSP, and a GPU. CPU is an abbreviation for Central Processing Unit. DSP is an abbreviation for Digital Signal Processor. GPU is an abbreviation for Graphics Processing Unit.

The memory 903 is a storage device to store data. An example of the memory 903 includes a RAM (Random Access Memory).

The communication device 904 is provided with a receiver 9041 to receive data and a transmitter 9042 to transmit data. An example of the communication device 904 includes a communication chip and an NIC (Network Interface Card).

The input interface 905 is a port to which the cable 911 is connected and whose example includes an USB terminal. USB is an abbreviation for Universal Serial Bus.

The display interface 906 is a port to which the cable 912 is connected. An example of the port includes an USB terminal and an HDMI terminal. HDMI (registered trademark) is an abbreviation for High Definition Multimedia Interface.

The input device 907 receives data, instructions, and requests. An example of the input device 907 includes a mouse, a keyboard, and a touch panel.

The display device 908 displays data, results, and responses. An example of the display device 908 includes an LCD (Liquid Crystal Display).

The memory 903 stores data used in, generated in, or inputted to/outputted from the architecture generating device 100.

More specifically, the memory 903 stores a system specification file 300, constraint information 191, a software specification file 192, a hardware specification file 193, and an architecture file 194.

Furthermore, an OS (Operating System) is loaded in the memory 903. Programs that implement the functions of "units" such as a specification accepting unit 110, a specification dividing unit 120, a specification editing unit 130, a constraint determining unit 140, a specification transforming unit 150, and an architecture generating unit 160 are loaded in the memory 903. The programs that implement the functions of the "units" can be stored in a storage medium.

The processor 901, while executing the OS, executes the programs that implement the functions of the "units". That is, the programs that implement the functions of the "units" are loaded in the memory 903 and executed by the processor 901.

The architecture generating device 100 may be provided with a plurality of processors 901. The plurality of processors 901 may cooperate with each other to execute the programs that implement the functions of the "units".

Data, information, signal values, variable values, and so on which indicate the processing results of the "units" are stored in the memory 903, a register in the processor 901, or a cache memory in the processor 901.

The "units" may be implemented by "circuitry". The "units" may be rephrased as "circuits", "steps", "procedures", or "processes".

The "circuits" and "circuitry" are a concept encompassing processing circuits such as the processor 901, a logic IC, a GA, an ASIC, and an FPGA. GA is an abbreviation for Gate Array. ASIC is an abbreviation for Application Specific Integrated Circuit. FPGA is an abbreviation for Field-Programmable Gate Array.

The specification accepting unit 110 accepts the system specification file 300 and the constraint information 191.

The system specification file 300 is a file in which processes to be executed in a built-in system 210 are described in a programming language. The built-in system 210 is a system to be implemented in the SoC.

The constraint information 191 is information including size constraint and time constraint. The size constraint is a condition for limiting the circuit size of hardware 212. The circuit size of the hardware 212 is equivalent to the size of a logic circuit included in the hardware 212. The time constraint is a condition for limiting the processing time of the hardware 212. The processing time of the hardware 212 is a time required by the hardware 212 to execute a process.

Figure 2:
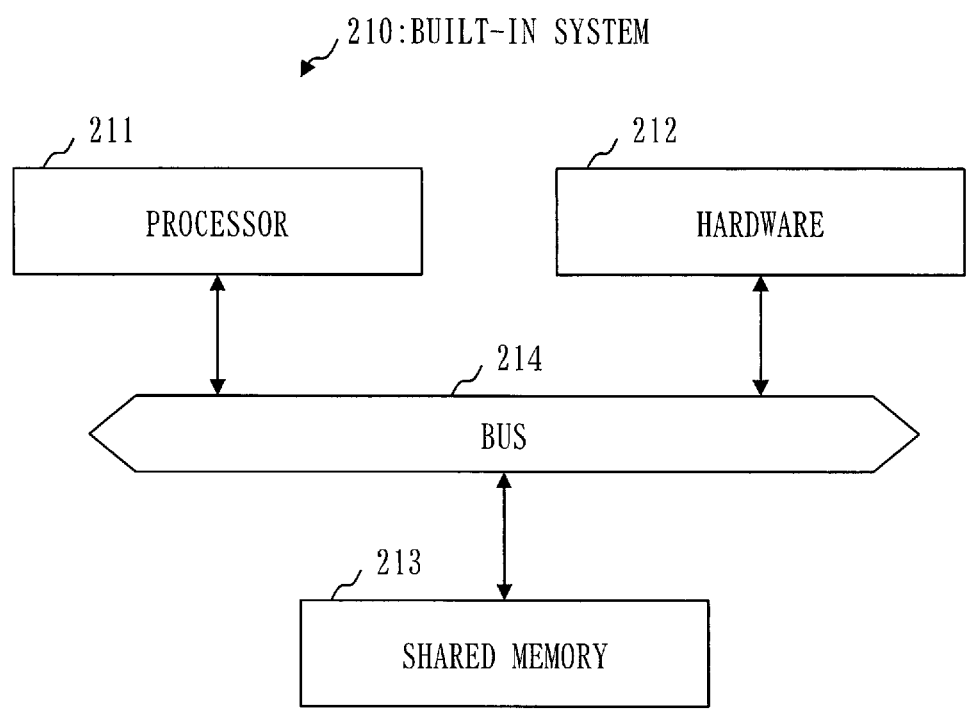
FIG. 2 is a configuration diagram of a built-in system 210 in Embodiment 1.

A configuration of the built-in system 210 will be described with reference to FIG. 2.

The built-in system 210 is provided with a processor 211, the hardware 212, a shared memory 213, and a bus 214.

The processor 211 executes a software process. The software process is a process executed by the processor 211 among the processes executed in the built-in system 210.

The hardware 212 executes a hardware process. The hardware process is a process executed by the hardware 212 among the processes executed in the built-in system 210.

The shared memory 213 is a memory shared by a plurality of hardware processes.

The processor 211, the hardware 212, and the shared memory 213 are connected to the bus 214.

A configuration of the system specification file 300 will be described with reference to FIG. 3.

The system specification file 300 is a file described in C language.

The system specification file 300 includes a plurality of declaration statements 301 and a plurality of processing statements 302.

The plurality of declaration statements 301 declare a plurality of arrays to be used in a plurality of processes.

The plurality of processing statements 302 indicate a plurality of processes that use different arrays.

The plurality of processes are processes to be executed in turn. That is, the plurality of processes are executed in the order of a process A, a process B, a process C, a process D, a process E, and a process F. A for-loop is an example of a unit of processing. A plurality of for-loops executed in turn are an example of a plurality of processes.

The process A uses an array memA. The process B uses an array memB.

The process C uses an array memC. The process D uses an array memD. The process E uses an array memE. The process F uses an array memF.

Regarding a line in which /* is attached to the head and */ is attached to the end, its process is not described in detail.

A configuration of the constraint information 191 will be described with reference to FIG. 4.

The constraint information 191 includes size constraint and time constraint.

The size constraint indicates the number of gates being the upper limit of the circuit size.

The time constraint indicates the number of cycles being the upper limit of the processing time.

Back to FIG. 1, the description of the architecture generating device 100 will resume.

The specification dividing unit 120 divides the system specification file 300 into the software specification file 192 and the hardware specification file 193.

The software specification file 192 is a file in which the processes executed by the processor 211 are described among processes described in the system specification file 300.

FIG. 5 illustrates the software specification file 192 obtained by dividing the system specification file 300 of FIG. 3.

The hardware specification file 193 is a file in which the processes to be executed by the hardware 212 are described among processes described in the system specification file 300.

FIG. 6 illustrates the hardware specification file 193 obtained by dividing the system specification file 300 of FIG. 3.

The hardware specification file 193 includes a plurality of declaration statements 301 and a plurality of processing statements 302.

The specification editing unit 130 is provided with a declaration statement identifying unit 131 and a specification generating unit 132.

The declaration statement identifying unit 131 identifies the plurality of declaration statements 301 from the hardware specification file 193 including the plurality of processing statements 302 indicating a plurality of processes which use different arrays and the plurality of declaration statements 301 declaring a plurality of arrays used in the plurality of processes.

The specification generating unit 132 generates a post-edit hardware specification file 193.

The post-edit hardware specification file 193 is generated by replacing the identified plurality of declaration statements 301 with a declaration statement 303 declaring a shared array to be shared by the plurality of processes and changing each of the plurality of processing statements 302 to a processing statement 304 indicating a process that uses the shared array.

FIG. 7 illustrates the post-edit hardware specification file 193 obtained by editing the hardware specification file 193 of FIG. 6.

The post-edit hardware specification file 193 includes the declaration statement 303 declaring the shared array and the plurality of processing statements 304 which use the shared array.

The constraint determining unit 140 determines if the post-edit hardware specification file 193 satisfies the size constraint and the time constraint in the following manner. The size constraint and the time constraint are constraint included in the constraint information 191.

First, the constraint determining unit 140 acquires a high-level synthesis result which is obtained by high-level synthesizing the post-edit hardware specification file 193.

Then, the constraint determining unit 140 determines if the post-edit hardware specification file 193 satisfies the size constraint and the time constraint with using the acquired high-level synthesis result.

The high-level synthesis result includes an RTL file and circuit size information and is acquired from a high-level synthesizing device 200.

The RTL file is a file in which RLT which expresses a configuration of the logic circuit of the hardware 212 is described. RTL is an abbreviation for Register Transfer Level.

The circuit size information is information indicating the circuit size of the hardware 212 in the configuration expressed by the RTL described in the RTL file.

If it is determined that the post-edit hardware specification file 193 satisfies the size constraint but not the time constraint, the specification transforming unit 150 generates a post-transform hardware specification file 193 in the following manner.

First, the specification transforming unit 150 selects one processing statement 304 as a target statement among the plurality of processing statements 304.

Then, the specification transforming unit 150 changes the plurality of processing statements 304 to a processing block including the target statement and processing blocks including processing statements other than the target statement.

Each processing block is a unity of at least one process constituting a series of processes. More specifically, a declaration statement, a for-statement, and a processing statement described in the for-statement constitute a processing block.

Furthermore, the specification transforming unit 150 performs editing as follows.

The specification transforming unit 150 replaces the declaration statement 303 declaring the shared array with a declaration statement 305 declaring external arrays used by the processing block including the target statement and the processing blocks including the processing statements 304 other than the target statement. The external arrays are arrays used in a plurality of processing blocks.

The specification transforming unit 150 changes the target statement to a processing statement 306 indicating a process that uses the external array.

The specification transforming unit 150 changes, among the processing statements 304 other than the target statement, a processing statement 304 that is consecutive to the target statement to a processing statement 306 which uses an external array.

The specification transforming unit 150 adds a declaration statement 307 declaring a shared array being shared by other processing statements, to each processing block having a plurality of other processing statements each being a processing statement other than the processing statement that is consecutive to the target statement, among the processing blocks including the processing statements 304 other than the target statement.

The specification transforming unit 150 changes the other processing statements to processing statements 308 indicating processes that use shared arrays respectively for the processing blocks.

FIG. 8 illustrates the post-transform hardware specification file 193 obtained by editing the post-edit hardware specification file 193.

If the processing statement 304 of the process D out of the processes A to F is selected as the target statement, the post-transform hardware specification file 193 includes the declaration statement 305 for external arrays, a processing block (1), a processing block (2), and a processing block (3).

As illustrated in FIG. 9, the processing block (1) includes the declaration statement 307 for a shared array, a processing statement 308 of the process A, a processing statement 308 of the process B, and a processing statement 306 of the process C.

As illustrated in FIG. 10, the processing block (2) includes a processing statement 306 of the process D.

As illustrated in FIG. 11, the processing block (3) includes a declaration statement 307 for a shared array, a processing statement 306 of the process E, and a processing statement 308 of the process F.

The constraint determining unit 140 determines if the post-transform hardware specification file 193 satisfies the size constraint and the time constraint.

The specification transforming unit 150 generates a post-re-transform hardware specification file 193 in the following manner.

First, if it is determined that the post-transform hardware specification file 193 satisfies the size constraint but not the time constraint, the specification transforming unit 150 selects, as an additional target statement, one processing statement 308 from target processing blocks being the processing blocks including processing statements other than the target statement.

Then, the specification transforming unit 150 changes the target processing blocks to a processing block including the additional target statement and processing blocks including processing statements other than the additional target statement.

FIG. 12 illustrates the post-re-transform hardware specification file 193 obtained by editing the post-transform hardware specification file 193 of FIG. 8.

Assume that the processing block (1) is selected out of processing blocks (1) to (3) as the target processing block and that the processing statement of the process B out of the processes A to C included in the processing block (1) is selected as the additional target statement.

In this case, the post-re-transform hardware specification file 193 includes a processing block (1-1), a processing block (1-2), and a processing block (1-3).

As illustrated in FIG. 13, the processing block (1-1) includes a processing statement 306 of the process A.

As illustrated in FIG. 14, the processing block (1-2) includes a processing statement 306 of the process B.

As illustrated in FIG. 15, the processing block (1-3) includes a processing statement 306 of the process C.

The constraint determining unit 140 determines if the post-re-transform hardware specification file 193 satisfies the size constraint.

If it is determined that the post-re-transform hardware specification file 193 does not satisfy the size constraint, the specification transforming unit 150 re-generates a post-re-transform hardware specification file 193 in the following manner.

First, the specification transforming unit 150 selects processing statements that are different from the additional target statement, as other target statements from the target processing block.

Then, the specification transforming unit 150 changes the target processing block to a processing block including other target statements and processing blocks including processing statements other than the other target statements.

FIG. 16 illustrates the post-re-transform hardware specification file 193 obtained by editing the post-transform hardware specification file 193 of FIG. 8.

Assume that the processing block (1) is selected out of processing blocks (1) to (3) as the target processing block and that the processing statement of the process C out of the processes A to C included in the processing block (1) is selected as other target statement.

In this case, the post-re-transform hardware specification file 193 includes a processing block (1-1) and a processing block (1-2).

As illustrated in FIG. 17, the processing block (1-1) includes a declaration statement 307 for a shared array, a processing statement 308 of the process A, and a processing statement 306 of the process B.

As illustrated in FIG. 18, the processing block (1-2) includes a processing statement 306 of the process C.

If it is determined that the post-re-transform hardware specification file 193 does not satisfy the size constraint, the specification transforming unit 150 re-generates a post-re-transform hardware specification file 193 in the following manner.

First, the specification transforming unit 150 selects processing statements 304 being different from the target statement, as other target statements from among the plurality of processing statements 304.

Then, the specification transforming unit 150 changes the plurality of processing statements 304 to a processing block including another target statement and processing blocks including processing statements 304 other than another target statement.

The architecture generating unit 160 generates an architecture file 194 as follows.

The architecture file 194 includes information of the hardware 212 having a logic circuit corresponding to the processing blocks included in the hardware specification file 193 and information of the shared memory 213 corresponding to the shared array declared in the hardware specification file 193.

The memory 903 stores data to be used in, generated in, or inputted to/outputted from the architecture generating device 100.

An example of the data to be stored in the memory 903 includes the system specification file 300, the constraint information 191, the software specification file 192, the hardware specification file 193, and the architecture file 194.

The high-level synthesizing device 200 is a device that carries out high-level synthesis. High-level synthesis is a function of generating description of RTL automatically by employing the description of programming language. A tool that implements this function is called a high-level synthesis tool. The programming language is a high-level language having higher abstractness than RTL. An example of the programming language includes C language, C++ language, and SystemC language.

* Description of Operation *

The operation of the architecture generating device 100 corresponds to an architecture generating method. The architecture generating method corresponds to a processing procedure of an architecture generating program.

Figure 19:
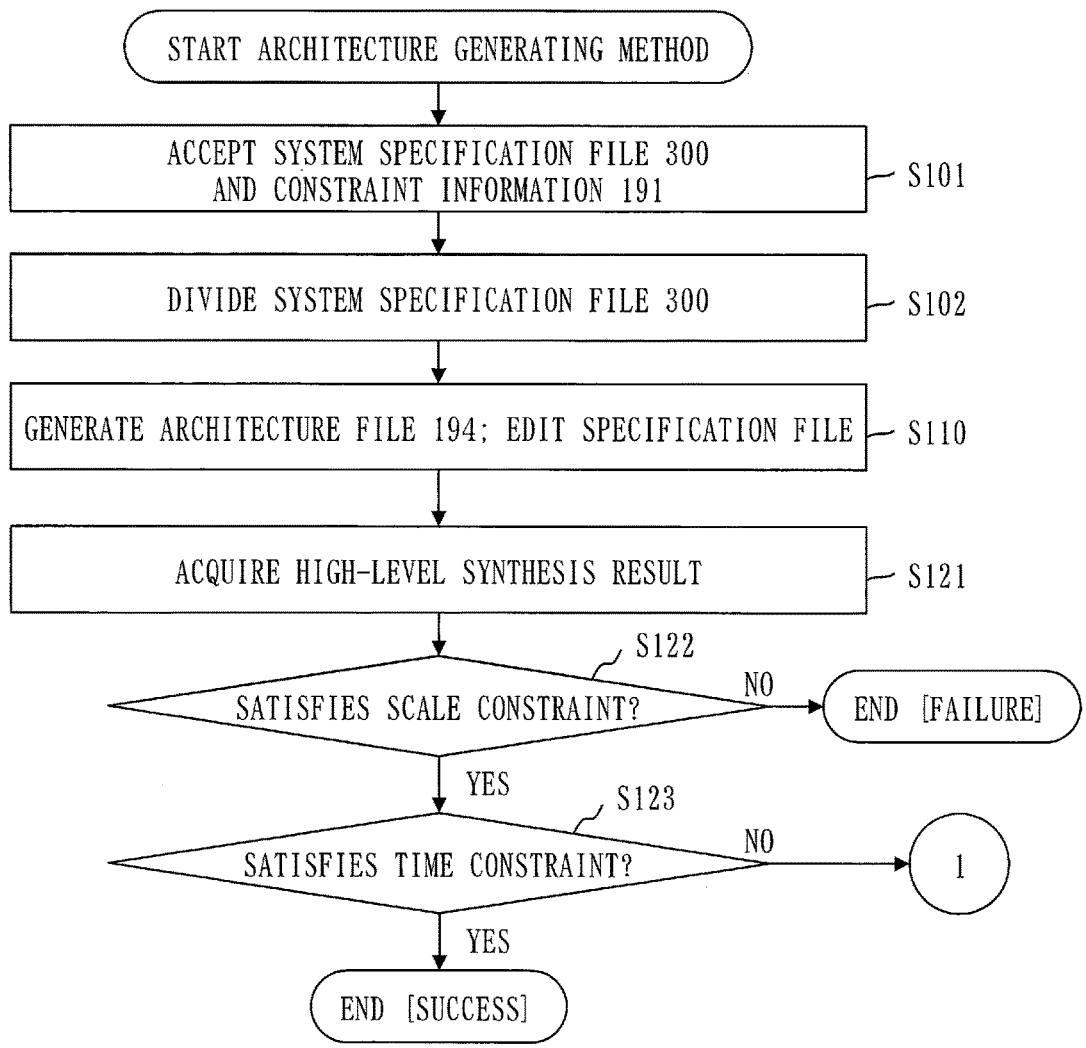
FIG. 19 is a flowchart of an architecture generating method in Embodiment 1.

The architecture generating method will be described with reference to FIGS. 19 and 20.

S101 expresses an accepting process.

In S101, the system specification file 300 and the constraint information 191 are inputted to the architecture generating device 100 by the user with using the input device 907.

The specification accepting unit 110 accepts the inputted system specification file 300 and constraint information 191 via the input interface 905.

S102 expresses a specification dividing process.

In S102, the specification dividing unit 120 divides the system specification file 300 into the software specification file 192 and the hardware specification file 193.

The system specification file 300 of FIG. 3 is divided into the software specification file 192 of FIG. 5 and the hardware specification file 193 of FIG. 6.

S110 expresses an architecture generating process and a specification edit process.

In S110, the architecture generating unit 160 generates the architecture file 194.

The specification editing unit 130 edits the software specification file 192 and edits the hardware specification file 193.

Figure 21:
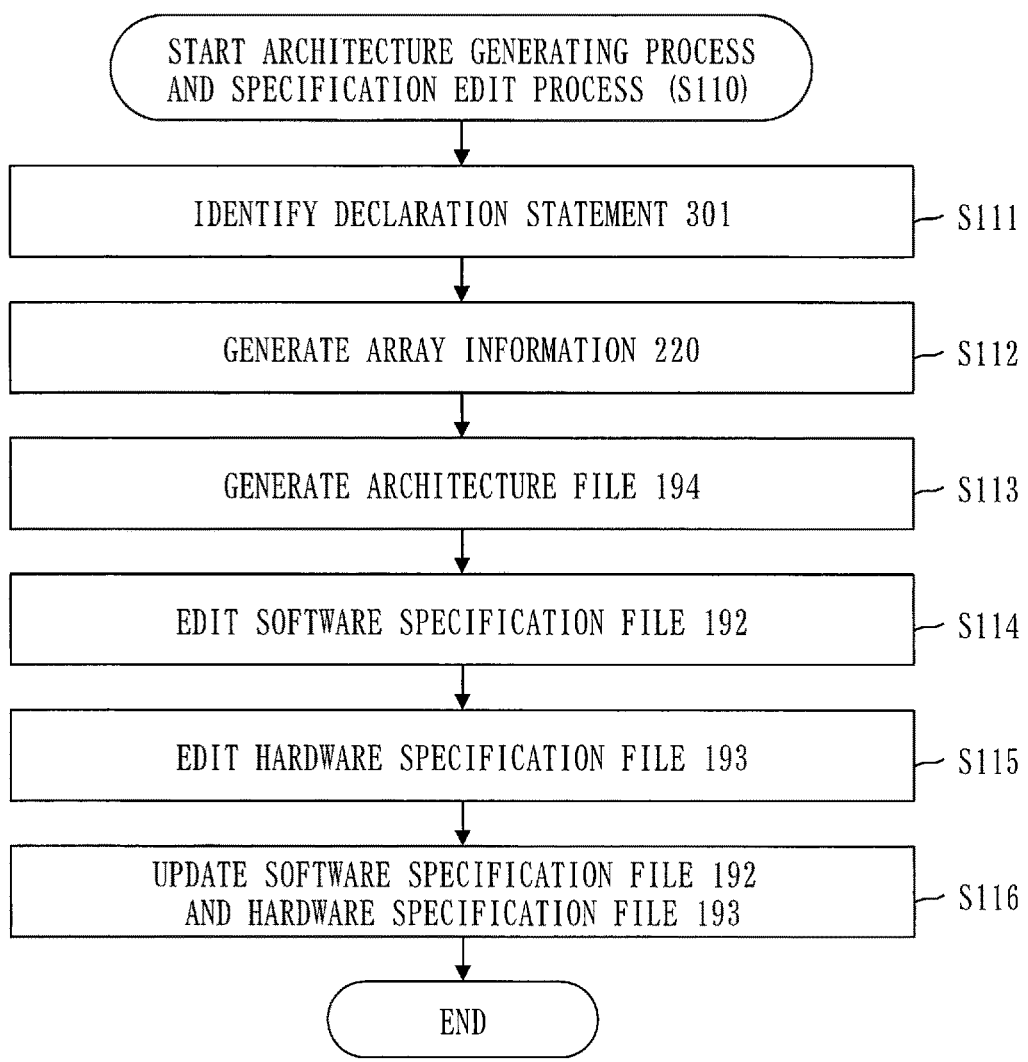
FIG. 21 is a flowchart of S110 in Embodiment 1.

The architecture generating process and the specification edit process (S110) will be described with reference to FIG. 21.

S111 expresses a declaration statement identification process.

In S111, the declaration statement identifying unit 131 analyzes the hardware specification file 193 and identifies a plurality of declaration statements 301 respectively declaring the arrays of the processes.

More specifically, the declaration statement identifying unit 131 identifies a statement that coincides with the syntax of the declaration statement as the declaration statement 301 by conducting lexical analysis and syntactic analysis for the hardware specification file 193.

Six declaration statements 301 are identified in the hardware specification file 193 of FIG. 6.

In S112, the declaration statement identifying unit 131 analyzes the plurality of declaration statements 301 and generates array information 220 indicating information of the arrays of the processes.

Figures 22, 23:
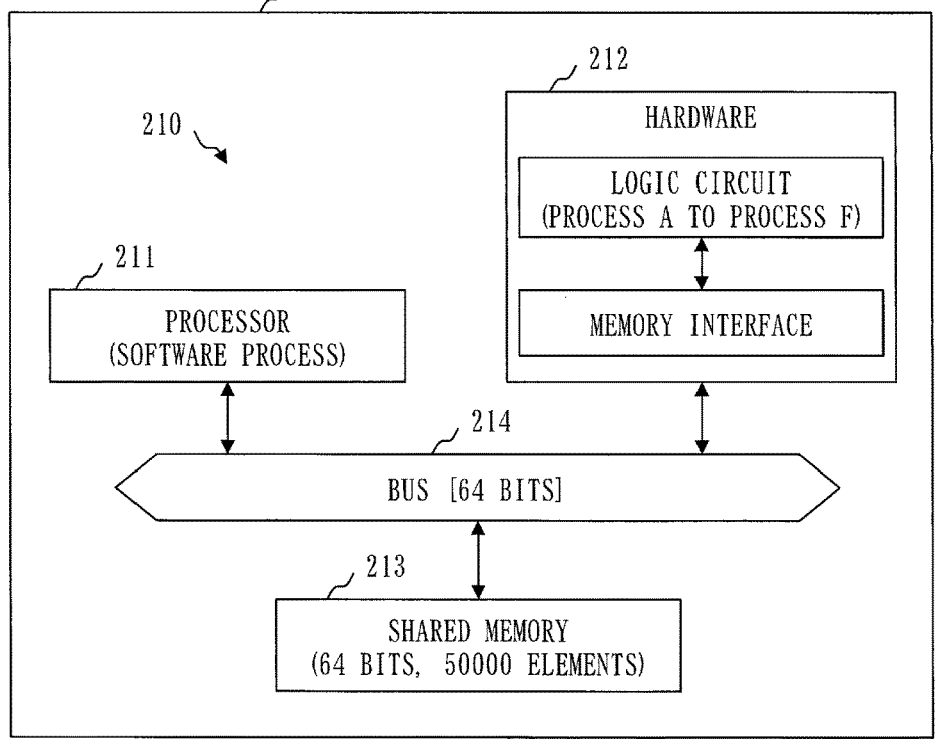
FIG. 22 is a diagram illustrating array information 220 in Embodiment 1.
FIG. 23 is a schematic diagram of an architecture file 194 in Embodiment 1.

FIG. 22 illustrates the array information 220 obtained by analyzing the six declaration statements 301 identified from the hardware specification file 193 of FIG. 6.

The array information 220 includes array names, bit widths, and the numbers of elements.

The array name is an array identifier identifying an array.

The bit width indicates the size of the elements constituting the array.

The number of the elements is the number of elements constituting the array.

In S113, the architecture generating unit 160 generates the architecture file 194 with using the system specification file 300 and the array information 220.

More specifically, the architecture generating unit 160 generates the architecture file 194 in the following manner with using a format that includes information of the processor 211, information of the hardware 212, information of the shared memory 213, and information of the bus 214.

The architecture generating unit 160 identifies processes included in the system specification file 300 by conducting lexical analysis and syntactic analysis for the system specification file 300. The architecture generating unit 160 then sets information of the identified process in the architecture file 194 as part of the information of the hardware 212.

Furthermore, the architecture generating unit 160 acquires the maximum bit width and the maximum number of elements from the array information 220. The architecture generating unit 160 sets in the architecture file 194 the maximum bit width as part of the information of the bus 214.

The architecture generating unit 160 also sets in the architecture file 194 the maximum bit width and the maximum number of elements as part of the information of the shared memory 213.

FIG. 23 illustrates the contents of the architecture file 194 generated with using the array information 220 of FIG. 22.

The architecture file 194 includes the information of the processor 211, the information of the hardware 212, the information of the shared memory 213, and the information of the bus 214, as the information of the architecture of the built-in system 210.

The information of the hardware 212 indicates that the hardware 212 has a logic circuit which executes the processes A to F and a memory interface which accesses the shared memory 213.

The information of the shared memory 213 indicates that the shared memory 213 has a bit width of 64 bits and the shared memory 213 has 50000 elements. The bit width of the shared memory 213 is the maximum bit width among the bit widths of the arrays indicated in the array information 220 of FIG. 22. The number of elements of the shared memory 213 is the maximum number of elements among the numbers of elements of the arrays indicated in the array information 220 of FIG. 22.

The information of the bus 214 indicates that the bus 214 has a bit width of 64 bits. The bit width of the bus 214 is the same as the bit width of the shared memory 213.

S114 expresses a software specification generating process.

In S114, the specification generating unit 132 generates a post-edit software specification file 192 by editing the software specification file 192 in the following manner.

The specification generating unit 132 adds description of an interface (H) to the software specification file 192. The interface (H) is an interface via which the processor 211 communicates with the hardware 212.

FIG. 24 illustrates the post-edit software specification file 192 generated by editing the software specification file 192 of FIG. 5.

S115 expresses a hardware specification generating process.

In S115, the specification generating unit 132 generates a post-edit hardware specification file 193 by editing the hardware specification file 193 in the following manner. The contents of the post-edit hardware specification file 193 match with the contents of the architecture file 194.

The specification generating unit 132 adds description of an interface (S) to the hardware specification file 193. The interface (S) is an interface via which the hardware 212 communicates with the processor 211.

The specification generating unit 132 replaces the declaration statements 301 declaring the arrays of the processes with the declaration statement 303 declaring the shared array. More specifically, the specification generating unit 132 generates the declaration statement 303 by editing the format of the declaration statement 303. The specification generating unit 132 then deletes the declaration statements 301 identified in S111 from the hardware specification file 193 and writes the declaration statement 303 to where the declaration statements 301 have been written.

The specification generating unit 132 changes the processing statements 302 indicating the processes that use arrays of the processes to processing statements 304 indicating processes that use a shared array. More specifically, the specification generating unit 132 searches for the arrays written in the declaration statements 301 identified in S111 and rewrites the names of the arrays hit by the search with the name of the shared array.

The hardware specification file 193 of FIG. 7 is generated by editing the hardware specification file 193 of FIG. 6.

The declaration statement 303 declares a shared array having 50000 of 64-bit elements. This shared array corresponds to the shared memory 213. The bit width of the shared array is the maximum bit width among the bit widths of the arrays indicated in the array information 220 of FIG. 22. The bit width of the shared array corresponds to the maximum number of elements among the numbers of elements of the arrays indicated in the array information 220 of FIG. 22.

In S116, the specification generating unit 132 writes the post-edit software specification file 192 over the software specification file 192 of the memory 903. Hence, the software specification file 192 is updated.

Furthermore, the specification generating unit 132 writes the post-edit hardware specification file 193 over the hardware specification file 193 of the memory 903. Hence, the hardware specification file 193 is updated.

After S116, the architecture generating process and the specification edit process (S110) end.

S121 to S123 express a constraint determining process.

S121 expresses a high-level synthesis result acquisition process.

In S121, the constraint determining unit 140 sends request data requesting high-level synthesis for the hardware specification file 193 to the high-level synthesizing device 200 via the transmitter 9042. The high-level synthesizing device 200 receives the request data, conducts high-level synthesis for the hardware specification file 193, and sends response data including the high-level synthesis result. The constraint determining unit 140 receives the response data via the receiver 9041 and acquires the high-level synthesis result from the response data.

The high-level synthesis result is a result obtained by conducting high-level synthesis for the hardware specification file 193 and includes an RTL file and circuit size information.

When requesting high-level synthesis, the constraint determining unit 140 designates an option that minimizes the circuit size. Hence, a configuration having a logic circuit shared by the processes A to F is described in the RTL file.

S122 expresses a size constraint determining process.

In S122, the constraint determining unit 140 compares the circuit size indicated by the circuit size information with the constraint value of the size constraint included in the constraint information 191.

Based on the comparison result, the constraint determining unit 140 determines if the hardware specification file 193 satisfies the size constraint.

If the hardware specification file 193 satisfies the size constraint, the processing proceeds to S123.

If the hardware specification file 193 does not satisfy the size constraint, the constraint determining unit 140 displays an error message notifying that automatic generation of the SoC architecture fails, on the display device 908 via the display interface 906. The architecture generating process ends.

S123 expresses a time constraint determining process.

In S123, the constraint determining unit 140 measures the processing time of the hardware process by simulating the operation of the hardware 212 with using the RTL file.

The constraint determining unit 140 then compares the measured processing time with the constraint value of the time constraint included in the constraint information 191.

The constraint determining unit 140 then determines if the hardware specification file 193 satisfies the time constraint based on the comparison result.

If the hardware specification file 193 satisfies the time constraint, the processing of the architecture generating process ends. When the processing ends, the software specification file 192, hardware specification file 193, and architecture file 194 which are generated finally are stored in the memory 903.

If the hardware specification file 193 does not satisfy the time constraint, the processing proceeds to S130.

FIG. 25 illustrates the circuit size and processing time obtained by assessing the hardware specification file 193 of FIG. 7.

The circuit size is smaller than the constraint value of the size constraint included in the constraint information 191 of FIG. 4. Accordingly, the hardware specification file 193 of FIG. 7 satisfies the size constraint.

The processing time is longer than the constraint value of the time constraint included in the constraint information 191 of FIG. 4. Accordingly, the hardware specification file 193 of FIG. 7 does not satisfy the time constraint.

Namely, the hardware specification file 193 of FIG. 7 satisfies the size constraint but not the time constraint. Therefore, the processing proceeds to S130.

S130 expresses an architecture transforming process and a specification transforming process.

In S130, the architecture generating unit 160 transforms the architecture file 194, and the specification transforming unit 150 transforms the hardware specification file 193.

The architecture transforming process and the specification transforming process (S130) will be described with reference to FIG. 26.

In S131, the specification transforming unit 150 measures the processing times of the hardware processes by simulating the operation of the hardware 212 with using the RTL file.

Figures 26, 27:
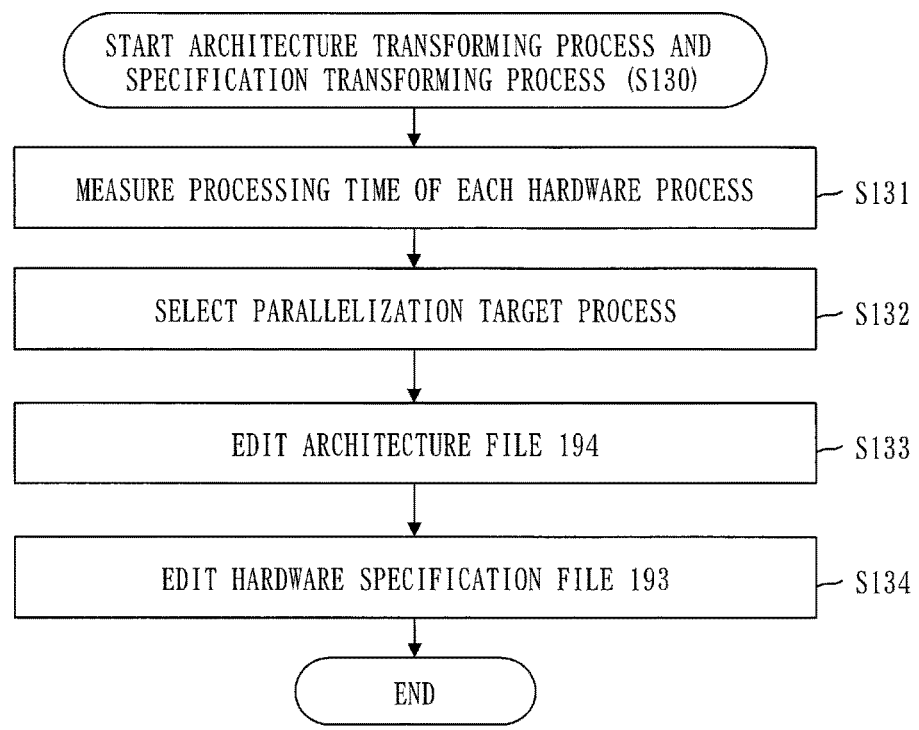
FIG. 26 is a flowchart of S130 in Embodiment 1.
FIG. 27 is a diagram illustrating processing time for each hardware process in Embodiment 1.

FIG. 27 illustrates the processing times of the processes A to F. These processing times indicate the result of the simulation executed with using the RTL file obtained by high-level synthesis of the hardware specification file 193 of FIG. 7.

In S132, the specification transforming unit 150 selects a hardware process that takes the longest processing time among non-selected hardware processes, as the target process. The target process is a hardware process being a target to be executed in parallel with other hardware processes.

More specifically, the specification transforming unit 150 sorts the processing times of the hardware processes in advance according to the lengths of the processing times. The specification transforming unit 150 then selects the hardware processes one by one according to the lengths of the processing times.

Among the processing times of the hardware processes illustrated in FIG. 27, the processing time of the process D is the longest, and accordingly the process D is selected as the first target process.

In S133, the architecture generating unit 160 edits the architecture file 194 such that the target process is executed in parallel with the other hardware processes, thereby generating a post-transform architecture file 194.

Figure 28:
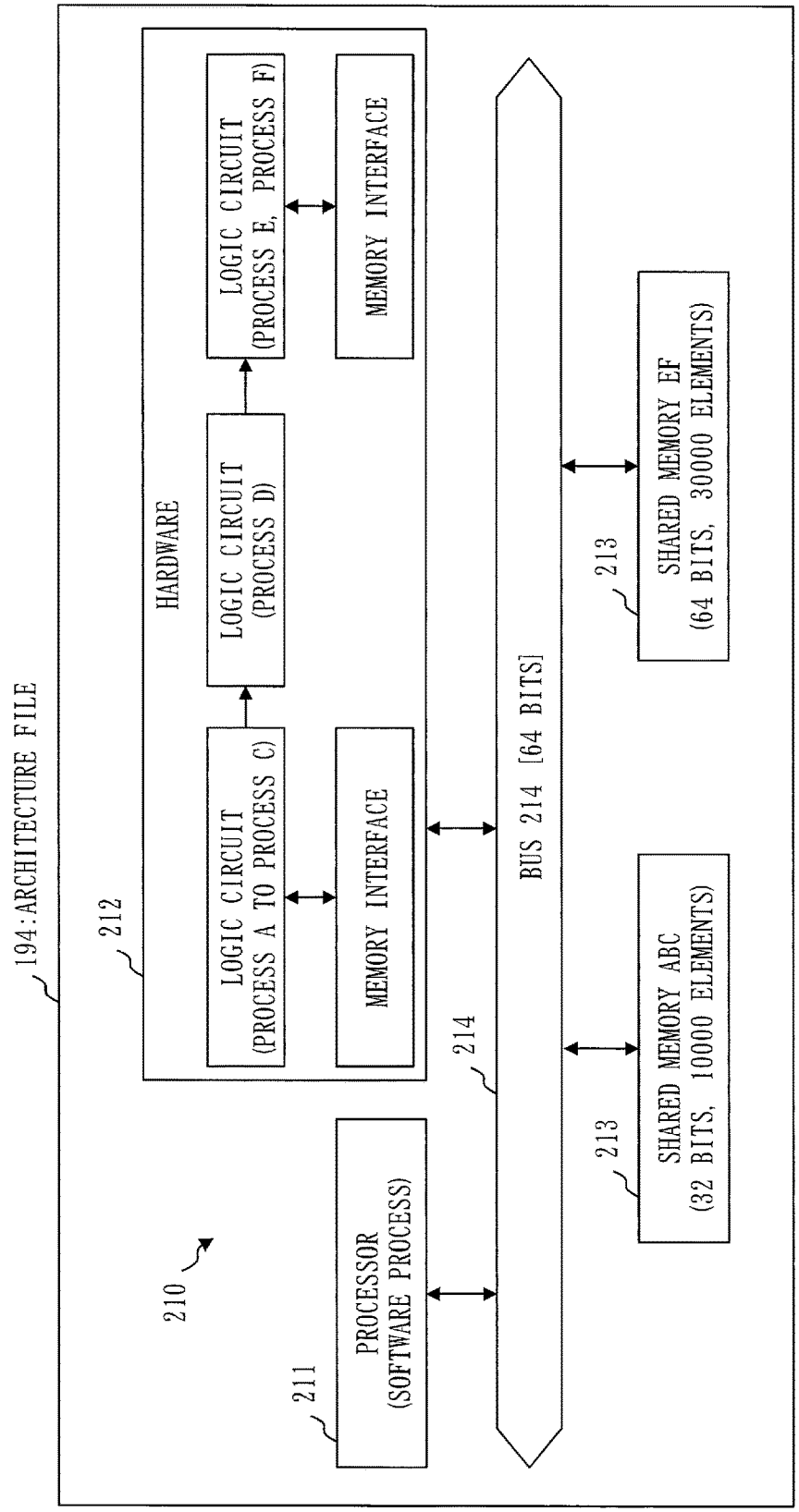
FIG. 28 is a schematic diagram of a post-transform architecture file 194 in Embodiment 1.

FIG. 28 illustrates the post-transform architecture file 194 generated by transforming the architecture file 194 of FIG. 23.

A built-in system 210 has a shared memory 213 for the processes A to C and a shared memory 213 for the processes E and F. The number of bits of the shared memory 213 for the processes A to C corresponds to the maximum bit width among the bit widths of the arrays for the processes A to C (see FIG. 22). The number of elements of the shared memory 213 for the processes A to C is the maximum number of elements among the numbers of elements of the arrays for the processes A to C. The number of bits of the shared memory 213 for the processes E and F corresponds to the maximum bit width among the bit widths of the arrays for the processes E and F (see FIG. 22). The number of elements of the shared memory 213 for the processes E and F is the maximum number of elements among the numbers of elements of the arrays for the processes E and F.

The hardware 212 has a logic circuit to execute the processes A to C, a logic circuit to execute the process D, and a logic circuit to execute the processes E and F. Furthermore, the hardware 212 has a memory interface to access the shared memory 213 for the processes A to C and a memory interface to access the shared memory 213 for the processes E and F.

In S134, the specification transforming unit 150 generates a post-transform hardware specification file 193 by editing the hardware specification file 193 in the following manner. The contents of the post-transform hardware specification file 193 match with the contents of the post-transform architecture file 194.

The specification transforming unit 150 changes the plurality of processing statements included in the hardware specification file 193 to a processing block including the target statement and processing blocks including processing statements other than the target statement. The target statement is a processing statement that indicates the target process. Namely, the specification transforming unit 150 divides the plurality of processing statements into a processing block including the target process selected in S132 and processing blocks to execute the other processes.

The specification transforming unit 150 replaces the declaration statement 303 declaring a shared array with a declaration statement 305 declaring an external array. More specifically, the specification transforming unit 150 generates the declaration statement 305 by editing the format of the declaration statement 305. The specification transforming unit 150 then deletes the declaration statement 303 from the hardware specification file 193 and writes the declaration statement 305 to where the declaration statement 303 has been written.

The specification transforming unit 150 changes the target statement to a processing statement 306 indicating a process that uses an external array. More specifically, the specification transforming unit 150 rewrites the description of the shared array included in the target statement with the description of the external array.

The specification transforming unit 150 changes a processing statement that is subsequent to the target statement, among the processing statements other than the target statement, to a processing statement that uses an external array. More specifically, the specification transforming unit 150 rewrites description of a shared array included in the processing statement that is subsequent to the target statement with the description of the external array.

The specification transforming unit 150 adds a declaration statement 307 declaring a shared array being shared by the other processing statements, to each processing block having a plurality of other processing statements each being a processing statement other than the processing statement that is consecutive to the target statement, among the processing blocks including the processing statements other than the target statement. More specifically, the specification transforming unit 150 selects the processing blocks including processing statements other than the target statement, and counts the number of the other processing statements of each selected processing block. Furthermore, the specification transforming unit 150 selects processing blocks each having a plurality of the other processing statements, from among the selected processing blocks. The specification transforming unit 150 then generates the declaration statement 307 by editing the format of the declaration statement 307, and writes the declaration statement 307 into each of the selected processing blocks.

The specification transforming unit 150 changes the other processing statements to processing statements 308 indicating processes that use shared arrays of the processing blocks. More specifically, the specification transforming unit 150 rewrites the descriptions of the shared arrays included in the other processing statements with the descriptions of the shared arrays for the processing blocks.

The hardware specification file 193 of FIGS. 8 to 11 is generated by editing the hardware specification file 193 of FIG. 7.

The hardware specification file 193 of FIGS. 8 to 11 includes the declaration statement 305 having external arrays. The number of bits and number of elements of an external array memDin are the same as the number of bits and number of elements, respectively, of an array memC for the process C which precedes the target process D. The number of bits and number of elements of an external array memDout are the same as the number of bits and number of elements, respectively, of an array memD for the target process D.

Furthermore, the hardware specification file 193 includes the processing block (1) to execute the process A, the process B, and the process C in turn, the processing block (2) to execute the process D, and the processing block (3) to execute the process E and the process F in turn.

The processing block (1) includes a declaration statement 307 for a shared array for the processing block (1), processing statements 308 of processes that use the shared array, and a processing statement 306 of a process that uses an external array. The processing statements 308 include processes that access a shared array ABC. The processing statement 306 includes a process that read-accesses the shared array ABC and a process that write-accesses the external array memDin.

The processing block (2) includes a processing statement 306 of processes that use an external array. The processing statement 306 includes a process that read-accesses the external array memDin and a process that write-accesses the external array memDout. The processing block (2) does not access the shared array.

The processing block (3) includes a declaration statement 307 for a shared array for the processing block (3), a processing statement 306 of a process that uses an external array, and a processing statement 308 of a process that uses a shared array. The processing statement 306 includes a process that read-accesses the external array memDout and a process that write-accesses a shared array EF. The processing statement 308 includes a process that accesses the shared array EF.

After S134, the architecture transforming process and the specification transforming process (S130) end.

Figure 29:
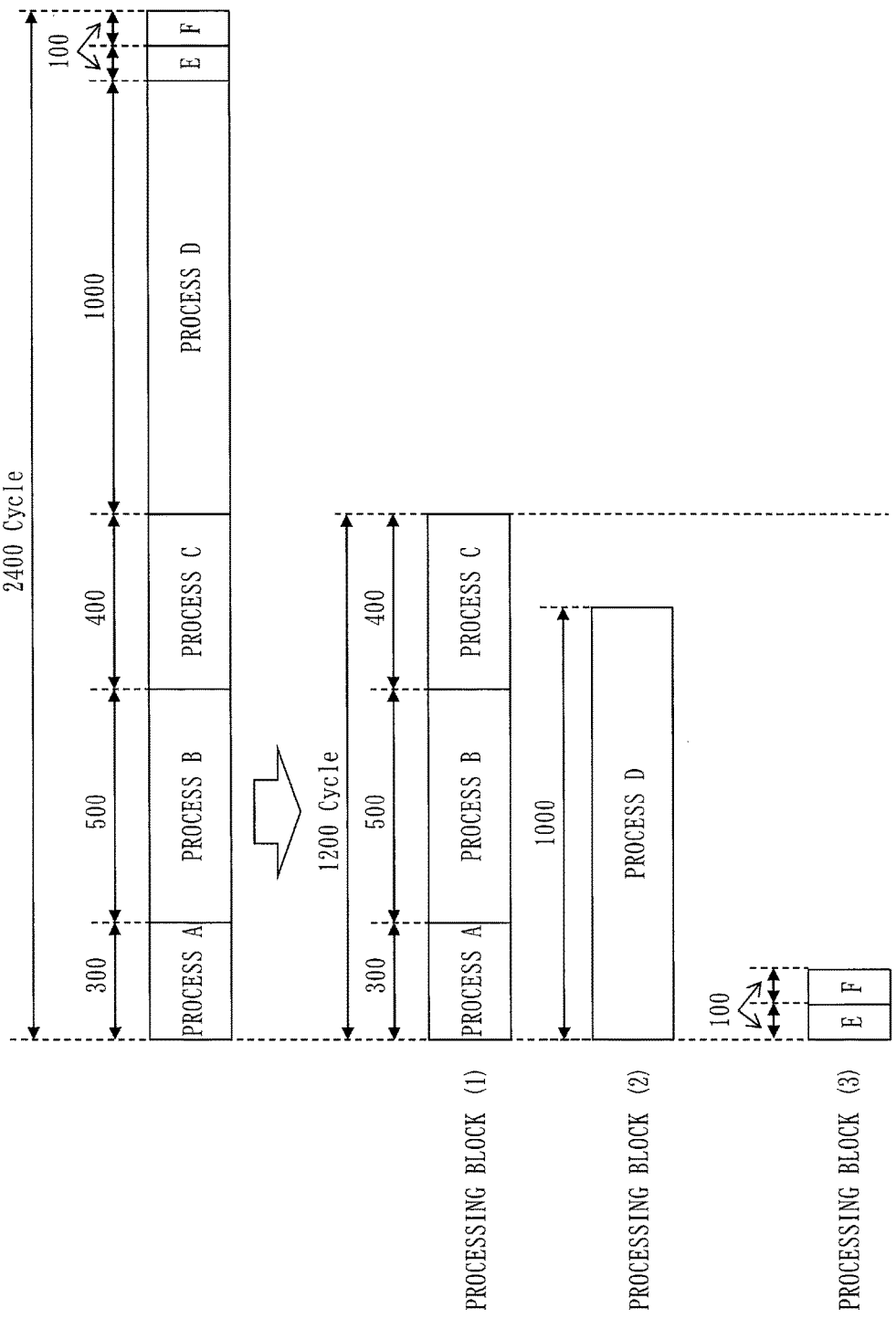
FIG. 29 is a diagram illustrating processing times of hardware processes after transform in Embodiment 1.

FIG. 29 illustrates a processing time taken when the processes A to F are executed in turn and a processing time taken when the processes A to C, the process D, and the processes E and F are executed in parallel with each other.

When the processes A to C, the process D, and the processes E and F are executed in parallel with each other, as compared to the case where the processes A to F are executed in turn, the circuit size is larger but the processing time is shorter.

Figure 20:
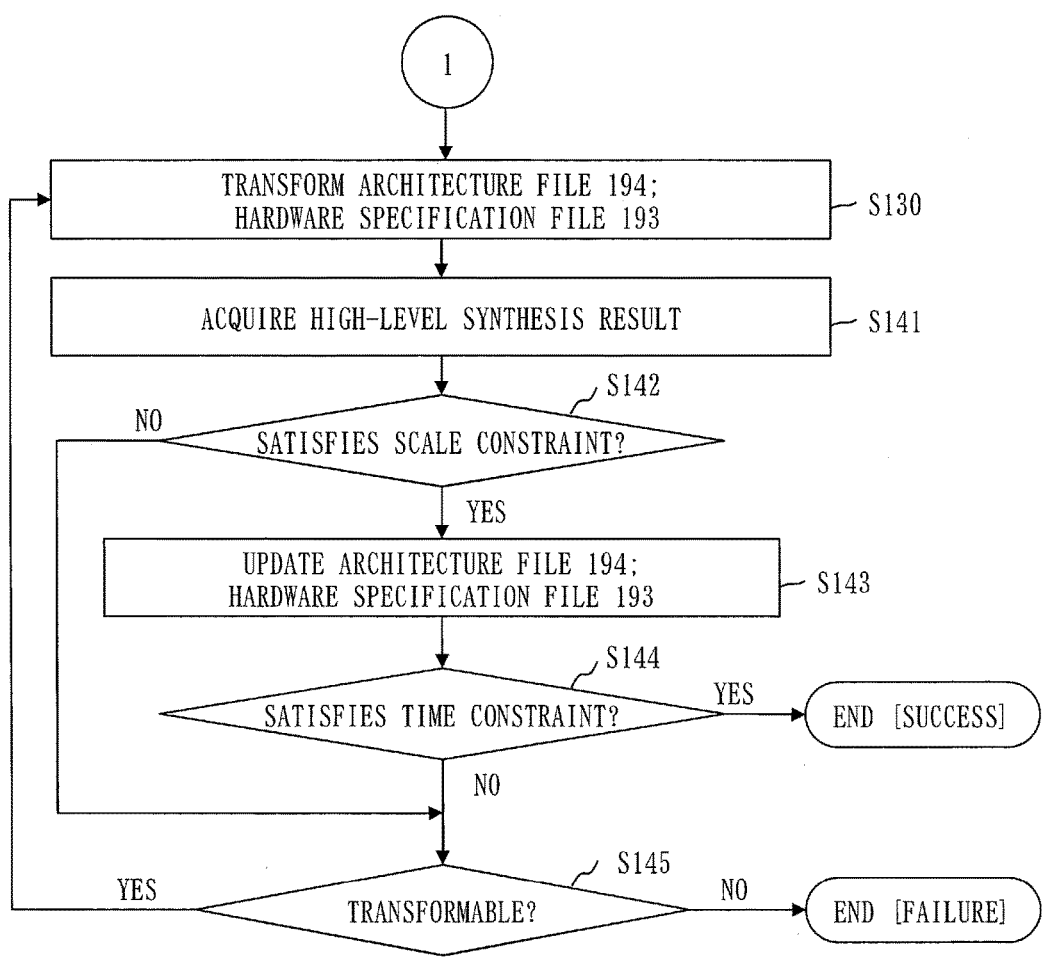
FIG. 20 is a flowchart of the architecture generating method in Embodiment 1.

Back to FIG. 20, the explanation will resume with S141.

S141 expresses a high-level synthesis result acquisition process.

In S141, the constraint determining unit 140 sends request data requesting high-level synthesis for the hardware specification file 193 to the high-level synthesizing device 200 via the transmitter 9042. The high-level synthesizing device 200 receives the request data, conducts high-level synthesis for the hardware specification file 193, and sends response data including a high-level synthesis result. The constraint determining unit 140 receives the response data via the receiver 9041 and acquires the high-level synthesis result from the response data.

The high-level synthesis result is a result obtained by high-level synthesis of the hardware specification file 193, and includes an RTL file and circuit size information.

When requesting high-level synthesis, the constraint determining unit 140 designates an option that minimizes the circuit size. Thus, a configuration including a logic circuit shared by the processes A to C and a logic circuit shared by the processes E and F are described in the RTL file.

S142 expresses a size constraint determining process.

In S142, the constraint determining unit 140 compares the circuit size indicated by the circuit size information with the constraint value of the size constraint included in the constraint information 191.

Based on the comparison result, the constraint determining unit 140 determines if the hardware specification file 193 satisfies the size constraint.

If the hardware specification file 193 satisfies the size constraint, the processing proceeds to S143.

If the hardware specification file 193 does not satisfy the size constraint, the process proceeds to S145.

In S143, the specification transforming unit 150 writes the post-transform software specification file 192 over the software specification file 192 of the memory 903. Hence, the software specification file 192 is updated.

Furthermore, the specification transforming unit 150 writes the post-transform hardware specification file 193 over the hardware specification file 193 of the memory 903. Hence, the hardware specification file 193 is updated.

S144 expresses a time constraint determining process.

In S144, the constraint determining unit 140 measures the processing time of the hardware process by simulating the operation of the hardware 212 with using the RTL file.

The constraint determining unit 140 then compares the measured processing time with the constraint value of the time constraint included in the constraint information 191.

The constraint determining unit 140 determines if the hardware specification file 193 satisfies the time constraint based on the comparison result.

If the hardware specification file 193 satisfies the time constraint, the processing of the architecture generating process ends. When the processing ends, the software specification file 192, hardware specification file 193, and architecture file 194 which are generated finally are stored in the memory 903.

If the hardware specification file 193 does not satisfy the time constraint, the processing proceeds to S145.

FIG. 30 illustrates the circuit size and processing time obtained by assessing the hardware specification file 193 of FIGS. 8 to 11.

The circuit size is smaller than the constraint value of the size constraint included in the constraint information 191 of FIG. 4. Therefore, the hardware specification file 193 of FIGS. 8 to 11 satisfies the size constraint.

The processing time is longer than the constraint value of the time constraint included in the constraint information 191 of FIG. 4. Therefore, the hardware specification file 193 of FIGS. 8 to 11 does not satisfy the time constraint.

Namely, the hardware specification file 193 of FIGS. 8 to 11 satisfies the size constraint but not the time constraint. Hence, the processing proceeds to S145.

In S145, the specification transforming unit 150 determines if the architecture file 194 and the hardware specification file 193 are further transformable.

Where there is a processing block including a hardware process not selected as a parallelization-target process, the architecture file 194 and the hardware specification file 193 can be further transformed.

If the architecture file 194 and the hardware specification file 193 are further transformable, the processing returns to S130.

If the architecture file 194 and the hardware specification file 193 are not further transformable, the specification transforming unit 150 displays an error message indicating that automatic generation of the SoC architecture fails, on the display device 908 via the display interface 906. The architecture generating process ends.

In the hardware specification file 193 of FIGS. 8 to 11, the processing block (1) includes the processes A to C not selected as the parallelization-target process. The processing block (3) includes the processes E and F not selected as the parallelization-target process.

That is, the architecture file 194 and the hardware specification file 193 are further transformable. Thus, the processing returns to S130.

In S130, the architecture generating unit 160 transforms the architecture file 194. The specification transforming unit 150 transforms the hardware specification file 193.

In the processing times of the hardware processes illustrated in FIG. 27, the process having the longest processing time among the processes excluding the process D selected as the parallelization-target process, is the process B. Hence, the process B is selected as the next target process.

Figure 31:
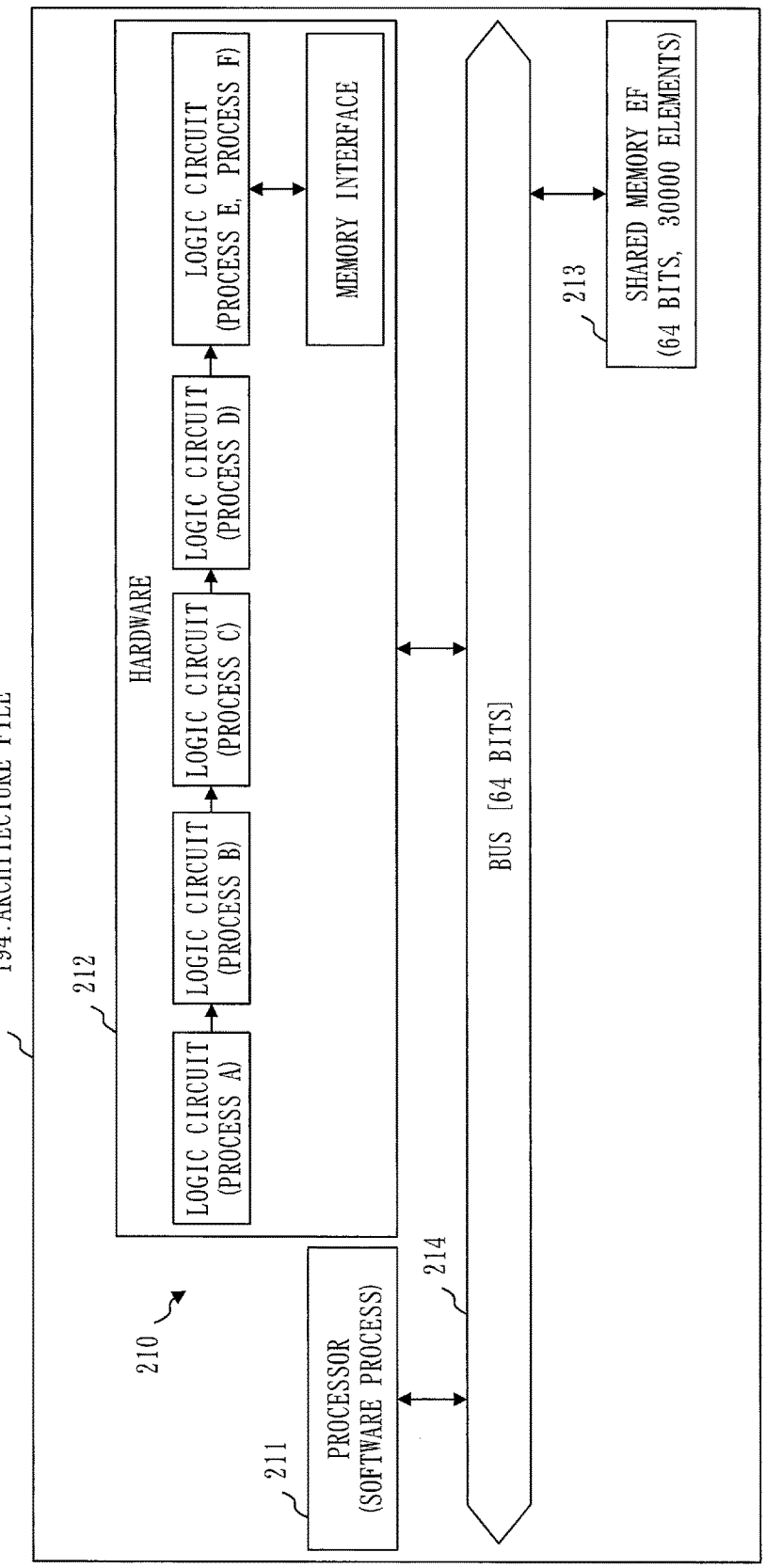
FIG. 31 is a schematic diagram of a post-re-transform architecture file 194 in Embodiment 1.

FIG. 31 illustrates the post-transform architecture file 194 generated by transforming the architecture file 194 of FIG. 28.

The built-in system 210 has a shared memory 213 for the processes E and F. The number of bits of the shared memory 213 for the processes E and F corresponds to the maximum bit width among the bit widths of the arrays for the processes E and F (see FIG. 22). The number of elements of the shared memory 213 for the processes E and F is the maximum number of elements among the numbers of elements of the arrays for the processes E and F.

The hardware 212 has a logic circuit to execute the process A, a logic circuit to execute the process B, a logic circuit to execute the process C, a logic circuit to execute the process D, and a logic circuit to execute the processes E and F. Furthermore, the hardware 212 has a memory interface to access the shared memory 213 for the processes E and F.

The hardware specification file 193 of FIGS. 12 to 15 is generated by editing the hardware specification file 193 of FIGS. 8 to 11.

The hardware specification file 193 of FIGS. 12 to 15 includes the declaration statement 305 for external arrays. The number of bits and number of elements of an external array memAout are the same as the number of bits and number of elements, respectively, of an array memA for the process A which precedes the target process B. The number of bits and number of elements of an external array memBout are the same as the number of bits and number of elements, respectively, of an array memB for the target process B. An external array memDin and an external array memDout are the same as the external arrays declared in the hardware specification file 193 of FIGS. 8 to 11.

Moreover, the hardware specification file 193 includes the processing block (1-1) to execute the process A, a processing block (1-2) to execute the process B, a processing block (1-3) to execute the process C, a processing block (2) to execute the process D, and the processing block (3) to execute the process E and the process F in turn.

The processing block (1-1) includes a processing statement 306 of the process A that uses an external array. The processing statement 306 includes a process that write-accesses the external array memAout.

The processing block (1-2) includes a processing statement 306 of the process B that uses an external array. The processing statement 306 includes a process that read-accesses the external array memAout and a process that write-accesses the external array memBout.

The processing block (1-3) includes a processing statement 306 of the process C that uses an external array. The processing statement 306 includes a process that read-accesses the external array memBout and a process that write-accesses the external array memDin.

The processing blocks (1-1) to (1-3) do not access a shared array EF.

The processing blocks (2) and (3) have been described with referring to FIGS. 10 and 11.

Figures 32, 33:
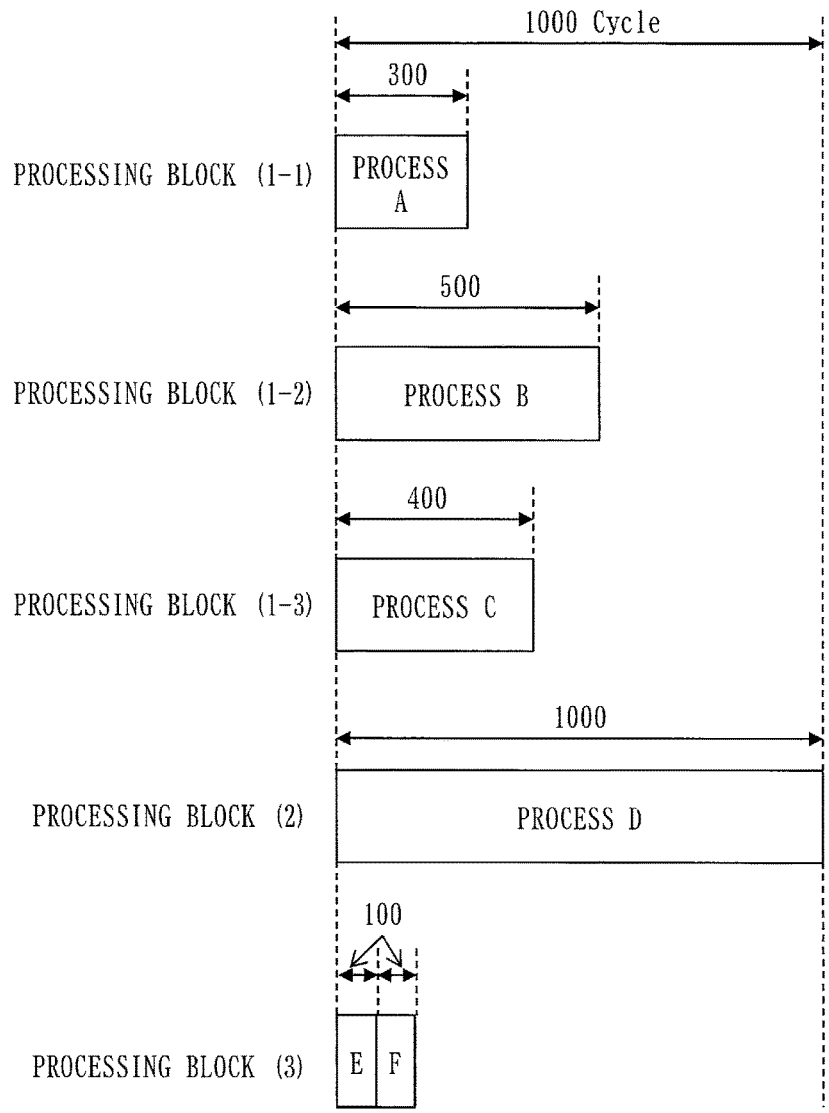
FIG. 32 is a diagram illustrating processing times of hardware processes after re-transform in Embodiment 1.
FIG. 33 is a diagram illustrating an assessment result of the post-re-transform hardware specification file 193 in Embodiment 1.

FIG. 32 illustrates a processing time taken when the process A, the process B, the process C, the process D, and the processes E to F are executed in parallel with each other. In this case, as compared to the case where the processes A to C, the process D, and the processes E to F are executed in parallel with each other (see FIG. 29), the circuit size is larger but the processing time is shorter.

FIG. 33 illustrates the circuit size and processing time obtained by assessing the hardware specification file 193 of FIGS. 12 to 15 in S141 to S144.

The circuit size is larger than the constraint value of the size constraint included in the constraint information 191 of FIG. 4. Therefore, the hardware specification file 193 of FIGS. 12 to 15 does not satisfy the size constraint.

The processing time is shorter than the constraint value of the time constraint included in the constraint information 191 of FIG. 4. Therefore, the hardware specification file 193 of FIGS. 12 to 15 satisfies the time constraint.

Namely, the hardware specification file 193 of FIGS. 12 to 15 satisfies the time constraint but not the size constraint. Hence, after S142, the processing proceeds to S145.

In this case, the architecture file 194 of the memory 903 is not updated, so the contents of the architecture file 194 remain the same as what are illustrated in FIG. 28. Also, the hardware specification file 193 of the memory 903 is not updated, so the contents of the hardware specification file 193 remain the same as what are illustrated in FIGS. 8 to 11.

In S145, the specification transforming unit 150 determines if the architecture file 194 and the hardware specification file 193 are further transformable.

Where there is a processing block including a hardware process not selected as a parallelization-target process, the architecture file 194 and the hardware specification file 193 can be further transformed.

If the architecture file 194 and the hardware specification file 193 are further transformable, the processing returns to S130.

If the architecture file 194 and the hardware specification file 193 are not further transformable, the specification transforming unit 150 displays an error message indicating that automatic generation of the SoC architecture fails, on the display device 908 via the display interface 906. The architecture generating process ends.

In the hardware specification file 193 of FIGS. 8 to 11, the processing block (1) includes the processes A and C each not selected as a parallelization-target process. The processing block (3) includes the processes E and F each not selected as a parallelization-target process.

That is, the architecture file 194 and the hardware specification file 193 are further transformable. Thus, the processing returns to S130.

In S130, the architecture generating unit 160 transforms the architecture file 194. The specification transforming unit 150 transforms the hardware specification file 193.

In the processing times of the hardware processes illustrated in FIG. 27, the process having the longest processing time among the processes A, B, C, and F each not selected as the parallelization-target process is the process C. Hence, the process C is selected as the next target process.

Figure 34:
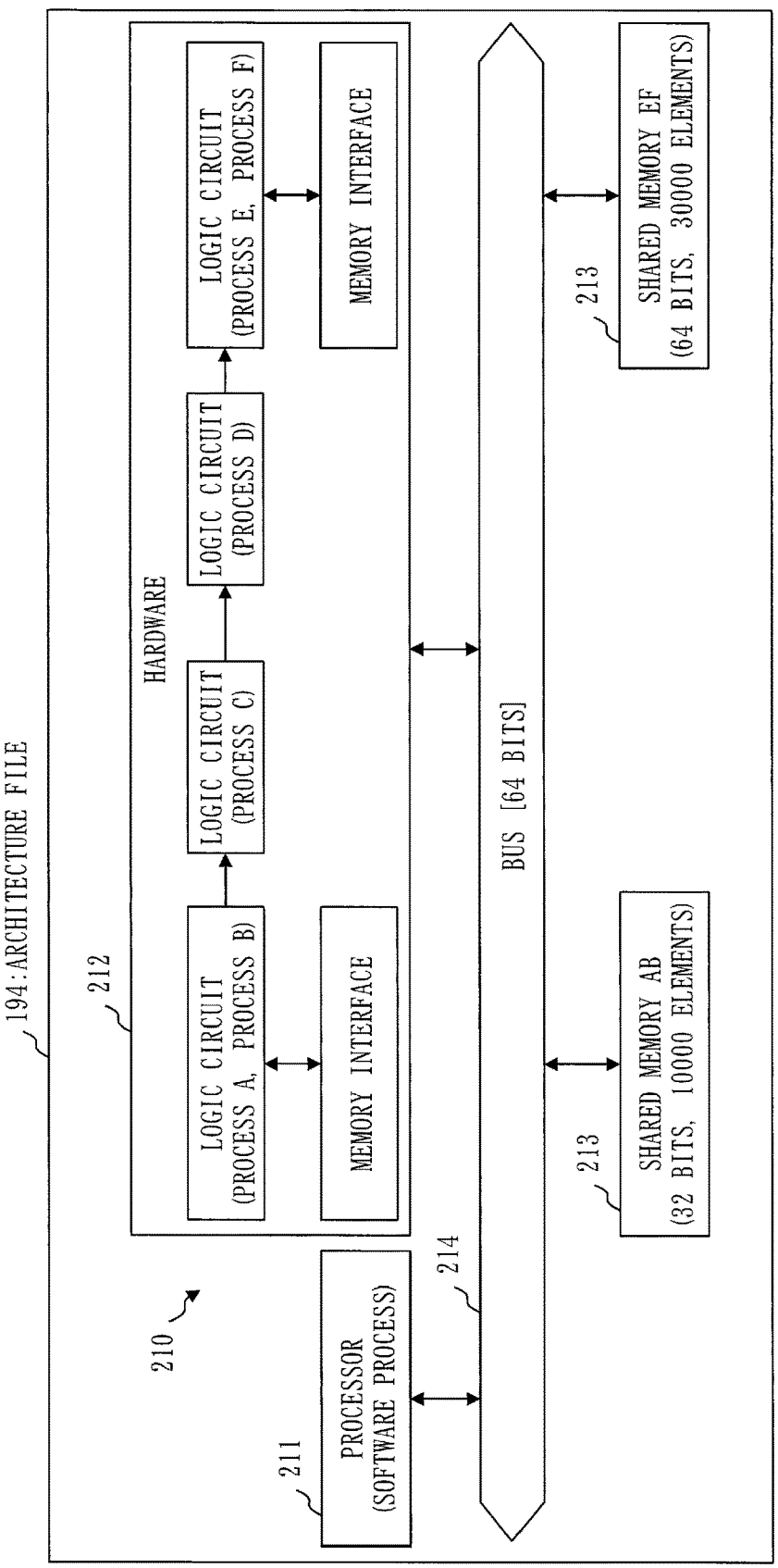
FIG. 34 is a schematic diagram of a post-re-transform architecture file 194 in Embodiment 1.

FIG. 34 illustrates the post-transform architecture file 194 generated by transforming the architecture file 194 of FIG. 28.

The built-in system 210 has a shared memory 213 for the processes A and B and a shared memory 213 for the processes E and F. The number of bits of the shared memory 213 for the processes A and B corresponds to the maximum bit width among the bit widths of the arrays for the processes A and B (see FIG. 22). The number of elements of the shared memory 213 for the processes A and B is the maximum number of elements among the numbers of elements of the arrays for the processes A and B. The number of bits of the shared memory 213 for the processes E and F corresponds to the maximum bit width among the bit widths of the arrays for the processes E and F (see FIG. 22). The number of elements of the shared memory 213 for the processes E and F is the maximum number of elements among the numbers of elements of the arrays for the processes E and F.

The hardware 212 has a logic circuit to execute the processes A and B, a logic circuit to execute the process C, a logic circuit to execute the process D, and a logic circuit to execute the processes E and F. Furthermore, the hardware 212 has a memory interface to access the shared memory 213 for the processes A and B, and a memory interface to access the shared memory 213 for the processes E and F.

The hardware specification file 193 of FIGS. 16 to 18 is generated by editing the hardware specification file 193 of FIGS. 8 to 11.

The hardware specification file 193 of FIGS. 16 to 18 includes the declaration statement 305 for external arrays. An external array memBout, an external array memDin, and an external array memDout are the same as the external arrays declared in the hardware specification file 193 of FIGS. 16 to 18.

Moreover, the hardware specification file 193 includes the processing block (1-1) to execute the processes A and B in turn, a processing block (1-2) to execute the process C, a processing block (2) to execute the process D, and the processing block (3) to execute the process E and the process F in turn.

The processing block (1-1) includes a declaration statement 307 which declares a shared array for the processing block (1-1), a processing statement 308 of the process A that uses the shared array, and the processing statement 306 of the process B that uses an external array. The processing statement 308 includes a process that write-accesses a shared array AB. The processing statement 306 includes a process that read-accesses the shared array AB and a process that write-accesses the external array memBout.

The processing block (1-2) includes a processing statement 306 of the process C that uses an external array. The processing statement 306 includes a process that read-accesses the external array memBout and a process that write-accesses the external array memDin. The processing block (1-2) does not access a shared memory.

The processing blocks (2) and (3) have been described with referring to FIGS. 10 and 11.

Figures 35, 36:
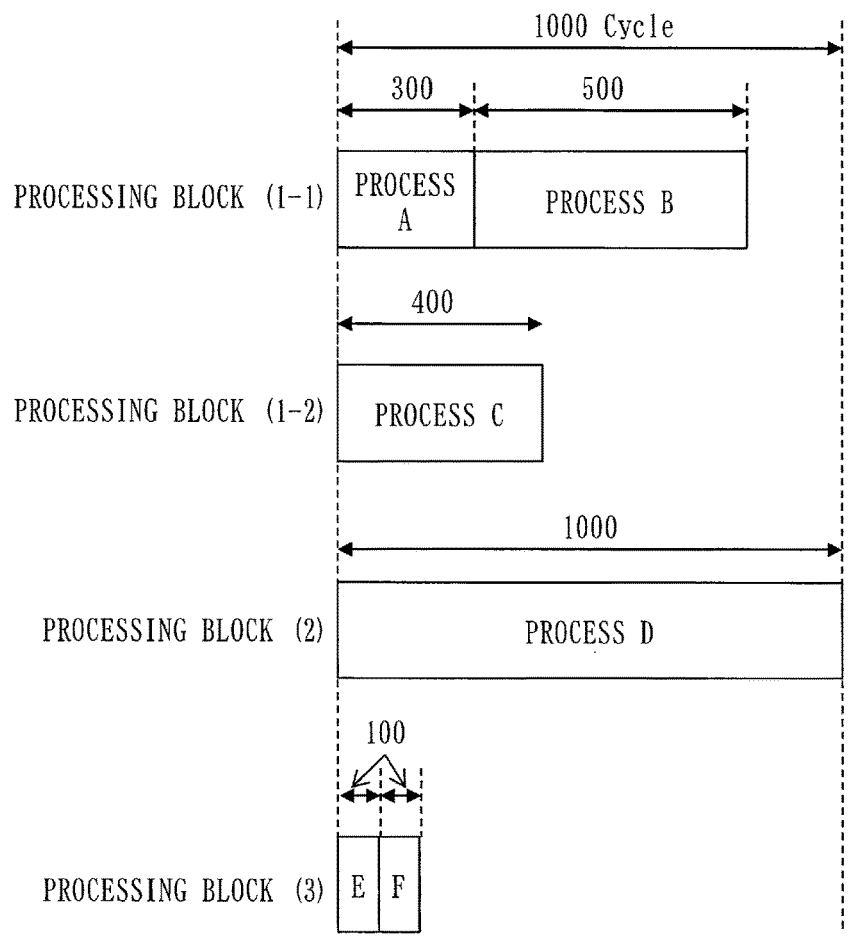
FIG. 35 is a diagram illustrating processing times of hardware processes after re-transform in Embodiment 1.
FIG. 36 is a diagram illustrating an assessment result of a post-re-transform hardware specification file 193 in Embodiment 1.

FIG. 35 illustrates a processing time taken when the processes A to B, the process C, the process D, and the processes E to F are executed in parallel with each other. In this case, as compared to the case where the processes A to C, the process D, and the processes E to F are executed in parallel with each other (see FIG. 29), the circuit size is larger but the processing time is shorter.

FIG. 36 illustrates the circuit size and processing time obtained by assessing the hardware specification file 193 of FIGS. 16 to 18 in S141 to S144.

The circuit size is smaller than the constraint value of the size constraint included in the constraint information 191 of FIG. 4. Therefore, the hardware specification file 193 of FIGS. 16 to 18 satisfies the size constraint.

The processing time is shorter than the constraint value of the time constraint included in the constraint information 191 of FIG. 4. Therefore, the hardware specification file 193 of FIGS. 16 to 18 satisfies the time constraint.

Namely, the hardware specification file 193 of FIGS. 16 to 18 satisfies both the time constraint and the size constraint.

Hence, after S141 to S144, the processing of the architecture generating method ends. At the end of the processing, the software specification file 192, hardware specification file 193, and architecture file 194 which are generated finally are stored in the memory 903.

The finally generated software specification file 192 is the software specification file 192 of FIG. 24.

The finally generated hardware specification file 193 is the hardware specification file 193 of FIGS. 16 to 18.

The finally generated architecture file 194 is the architecture file 194 of FIG. 34.

* Description of Effect of Embodiment *

The architecture generating device 100 can generate an SoC architecture that satisfies the size constraint and the time constraint with using the system specification file 300. Therefore, the designer can obtain an SoC architecture that satisfies the size constraint and the time constraint without studying an SoC architecture that satisfies the size constraint and the time constraint based on the system specification file 300.

* Other Configurations *

The system specification file 300 may be described in a programming language other than the C language, such as C++ language, SystemC language, or the like.

In S102 (see FIG. 19), the method disclosed in Patent Literature 1 may be applied to divide the hardware specification file 193. The hardware specification file 193 may be divided by a method other than the method disclosed in Patent Literature 1.

Before the declaration statement 301 is identified in S111 (see FIG. 21), description of an unnecessary array may be deleted from the hardware specification file 193. Then, reduction of the circuit size of the hardware 212 can be expected. The memory delete function disclosed in Patent Literature 3 can be applied to delete the description of an unnecessary array.

In S114 (see FIG. 21), the method disclosed in Patent Literature 2 can be applied to add description of the interface (H). Description of the interface (H) may be added by a method other than the method disclosed in Patent Literature 2.

In S115 (see FIG. 21), the method disclosed in Patent Literature 2 can be applied to add description of an interface (S). Description of the interface (S) may be added by a method other than the method disclosed in the Patent Literature 2.

In FIG. 6, the first process which executes func1( ) and the second process which executes func2( ) exist between the processes C and D. The first process and the second process may be included in the processing block that includes the process C, or the processing block that includes the process D. The first process may be included in the processing block that includes the process C, while the second process may be included in the processing block that includes the process D. Desirably, the number of pins between the processing blocks may become the minimum. The number of pins between the processing blocks corresponds to the number of lines between the processing blocks.

Desirably, double buffers or an FIFO is implemented in the SoC of the built-in system 210 so that a plurality of processing blocks operate in a parallel manner FIFO is an abbreviation for First IN, First Out.

Note that the embodiment is merely an illustration of a preferable example and is not intended to limit the technical scope of the present invention. The embodiment may be practiced partly or may be practiced in combination with other embodiments.

The processing procedures described with referring to flowcharts and so on are examples of a processing procedure of an architecture generating device, architecture generating method, and architecture generating program.

REFERENCE SIGNS LIST

100: architecture generating device; 110: specification accepting unit; 120: specification dividing unit; 130: specification editing unit; 131: declaration statement identifying unit; 132: specification generating unit; 140: constraint determining unit; 150: specification transforming unit; 160: architecture generating unit; 191: constraint information; 192: software specification file; 193: hardware specification file; 194: architecture file; 200: high-level synthesizing device; 210: built-in system; 211: processor; 212: hardware; 213: shared memory; 214: bus; 220: array information; 300: system specification file; 301: declaration statement; 302: processing statement; 303: declaration statement; 304: processing statement; 305: declaration statement; 306: processing statement; 307: declaration statement; 901: processor; 902: auxiliary storage device; 903: memory; 904: communication device; 9041: receiver; 9042: transmitter; 905: input interface; 906: display interface; 907: input device; 908: display device; 910: signal line; 911: cable; 912: cable

The invention claimed is:

1. An architecture generating device for automating generation of a system on chip (SoC) architecture design that meets predefined size and time constraints, comprising:
 a memory storing a hardware specification file defining processes to be executed by hardware are described in a programming language, the hardware specification file including a plurality of processing statements indicating a plurality of processes that use arrays different from each other, and a plurality of declaration statements declaring a plurality of arrays used in the plurality of processes; and
 processing circuitry configured to
  identify a plurality of declaration statements from a hardware specification file stored in memory,
  generate a post-edit hardware specification file by replacing the identified plurality of declaration statements with a declaration statement declaring a shared array to be shared by the plurality of processes and changing each of the plurality of processing statements to a processing statement indicating a process that uses the shared array,
  obtain an register transfer level (RTL) file and circuit size information by conducting high-level synthesis of the post-edit hardware specification file,
  determine if the post-edit hardware specification file satisfies a size constraint which limits a circuit size and a time constraint which limits a processing time based on the obtained RTL file and circuit size information,
  if it determines that the post-edit hardware specification files satisfies both the size and time constraints,
   generate an architecture file which includes information of hardware having a logic circuit corresponding to the processing blocks included in the hardware specification file and information of a shared memory corresponding to the shared array declared in the hardware specification file, and
  if it is determined that the post-edit hardware specification file satisfies the size constraint but not the time constraint,
   (a) generate a post-transform hardware specification file by selecting one processing statement as a target statement among the plurality of processing statements, and changing the plurality of processing statements to a processing block including the target statement and processing blocks including processing statements other than the target statement,
   (b) obtain an RTL file and circuit size information by conducting high-level synthesis of the post-transform hardware specification file, and
   repeating (a) and (b) until either both the size and time constraints are satisfied or the size constraint is no longer satisfied.

2. The architecture generating device according to claim 1, wherein, when repeating (a), if it is determined that the post-re-transform hardware specification file does not satisfy the size constraint, the processing circuitry re-generates a post-re-transform hardware specification file by selecting, as other target statement, a processing statement that is different from the additional target statement, from the target processing blocks, and changing the target processing blocks to a processing block including the other target statement and processing blocks including processing statements other than the other target statement.

3. The architecture generating device according to claim 1,
 wherein the processing circuitry determines if the post-transform hardware specification file satisfies the size constraint, and
 wherein, when repeating (a) and (b), if it is determined that the post-transform hardware specification file does not satisfy the size constraint, the processing circuitry re-generates a post-transform hardware specification file by selecting, as other target statement, a processing statement being different from the target statement, from among the plurality of processing statements, and changing the plurality of processing statements to a processing block including the other target statement and processing blocks including processing statements other than the other target statement.

4. The architecture generating device according to claim 1,
wherein the plurality of processes are processes that are executed in turn, and
wherein the processing circuitry replaces the declaration statement declaring the shared array with a declaration statement declaring an external array used by a processing block including the target statement and processing blocks including processing statements other than the target statement, changes the target statement to a processing statement indicating a process that uses the external array, and changes a processing statement that is subsequent to the target statement among the processing statements other than the target statement, to a processing statement that uses an external array.

5. The architecture generating device according to claim 4, wherein the processing circuitry adds a declaration statement declaring a shared array being shared by other processing statements, to each of processing blocks having a plurality of the other processing statements each being a processing statement other than the processing statement that is consecutive to the target statement, among the processing blocks including the processing statements other than the target statement, and changes each of the other processing statements to a processing statement indicating a process that uses a shared array of a corresponding one of the processing blocks.

* * * * *